US010829155B2

(12) United States Patent
Gunji et al.

(10) Patent No.: US 10,829,155 B2
(45) Date of Patent: Nov. 10, 2020

(54) SUSPENSION OPERATION SYSTEM AND SUSPENSION OPERATION TERMINAL

(71) Applicant: NSK LTD., Tokyo (JP)

(72) Inventors: Daisuke Gunji, Kanagawa (JP); Hiroyasu Kumagai, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/610,317

(22) PCT Filed: Sep. 28, 2018

(86) PCT No.: PCT/JP2018/036255
§ 371 (c)(1),
(2) Date: Nov. 1, 2019

(87) PCT Pub. No.: WO2019/077972
PCT Pub. Date: Apr. 25, 2019

(65) Prior Publication Data
US 2020/0070891 A1  Mar. 5, 2020

(30) Foreign Application Priority Data
Oct. 19, 2017  (JP) ................ 2017-202530

(51) Int. Cl.
*B62D 17/00* (2006.01)
*B60G 7/00* (2006.01)
*B60G 3/20* (2006.01)

(52) U.S. Cl.
CPC ............... *B62D 17/00* (2013.01); *B60G 3/20* (2013.01); *B60G 7/003* (2013.01);
(Continued)

(58) Field of Classification Search
CPC ............ B62D 17/00; B60G 7/00; B60G 3/20
See application file for complete search history.

(56) References Cited

U.S. PATENT DOCUMENTS

| 2,642,752 A | 6/1953 | Geyer et al. |
| 5,141,069 A | 8/1992 | Yasui |
| (Continued) | | |

FOREIGN PATENT DOCUMENTS

| JP | 55-44153 A | 3/1980 |
| JP | 55-86116 U | 6/1980 |
| (Continued) | | |

OTHER PUBLICATIONS

International Search Report for PCT/JP2018/036255 dated Nov. 13, 2018.
(Continued)

*Primary Examiner* — Kira Nguyen
(74) *Attorney, Agent, or Firm* — Sughrue Mion, PLLC

(57) ABSTRACT

A suspension operation system includes: a suspension that includes a plurality of links supporting a wheel, at least one or more of the links having an actuator increasing or decreasing its length in an axial direction; a control device that supplies a drive signal to the actuator to control operation of the suspension; and a suspension operation terminal that operates the suspension. The suspension operation terminal includes: a detector that detects operation input information to the suspension operation terminal; and a communicator that transmits information about a target posture of the wheel, the information being based on the operation input information, to the control device as an operation command. The control device includes: a first calculator that calculates the length of the actuator on the basis of the operation command; and a drive circuit that produces the drive signal on the basis of information from the first calculator.

5 Claims, 19 Drawing Sheets

(52) U.S. Cl.
CPC .............. *B60G 2200/46* (2013.01); *B60G 2400/05142* (2013.01); *B60G 2400/05144* (2013.01); *B60G 2600/11* (2013.01)

(56) References Cited

U.S. PATENT DOCUMENTS

| | | | |
|---|---|---|---|
| 7,562,594 B2 | 7/2009 | Nagai et al. | |
| 8,960,690 B2 | 2/2015 | Hinohara et al. | |
| 2006/0081078 A1 | 4/2006 | Nagai et al. | |
| 2008/0167778 A1* | 7/2008 | Tsukasaki | B62D 7/09 701/41 |
| 2008/0257081 A1 | 10/2008 | Hakui et al. | |
| 2010/0019465 A1 | 1/2010 | Yuta et al. | |
| 2010/0289658 A1 | 11/2010 | Brown | |
| 2011/0101637 A1 | 5/2011 | Shibuya | |
| 2011/0107859 A1 | 5/2011 | Osterlanger et al. | |
| 2014/0300067 A1* | 10/2014 | Yoo | B60G 17/016 280/5.514 |
| 2018/0022346 A1 | 1/2018 | Murakami | |
| 2019/0009629 A1* | 1/2019 | Beylin | B60G 21/04 |
| 2019/0381847 A1 | 12/2019 | Kumagai et al. | |

FOREIGN PATENT DOCUMENTS

| | | |
|---|---|---|
| JP | 56-101216 U | 8/1981 |
| JP | 56-101218 U | 8/1981 |
| JP | 1-112138 U | 7/1989 |
| JP | 4-228370 A | 8/1992 |
| JP | 06-286447 A | 10/1994 |
| JP | 2004-122932 A | 4/2004 |
| JP | 2005-145122 A | 6/2005 |
| JP | 2005-289288 A | 10/2005 |
| JP | 2006-064162 A | 3/2006 |
| JP | 2006-218959 A | 8/2006 |
| JP | 2007-210497 A | 8/2007 |
| JP | 3137802 U | 12/2007 |
| JP | 2009-133339 A | 6/2009 |
| JP | 2010-052583 A | 3/2010 |
| JP | 2010-510926 A | 4/2010 |
| JP | 2010-179691 A | 8/2010 |
| JP | 2014-012473 A | 1/2014 |
| JP | 2014-190436 A | 10/2014 |
| JP | 2014-234078 A | 12/2014 |
| JP | 2015-155255 A | 8/2015 |
| JP | 5955254 B2 | 7/2016 |
| WO | 2009/141265 A1 | 11/2009 |
| WO | 2010/140237 A1 | 12/2010 |
| WO | 2016/125586 A1 | 8/2016 |
| WO | 2019/077972 A1 | 4/2019 |
| WO | 2019/078118 A1 | 4/2019 |
| WO | 2019/078119 A1 | 4/2019 |
| WO | 2019/078120 A1 | 4/2019 |
| WO | 2019/078121 A1 | 4/2019 |
| WO | 2019/111534 A1 | 6/2019 |

OTHER PUBLICATIONS

Communication dated Mar. 12, 2019 in Japanese Application No. 2019-507873 English Translation.
International Search Report dated Jan. 15, 2019 in International Application No. PCT/JP2018/038137.
International Search Report dated Jan. 15, 2019 in International Application No. PCT/JP2018/038136.
International Search Report dated Nov. 27, 2018 in International Application No. PCT/JP2018/038135.
Written Opinion of the International Searching Authority dated Jan. 15, 2019 in International Application No. PCT/JP2018/038136.

* cited by examiner

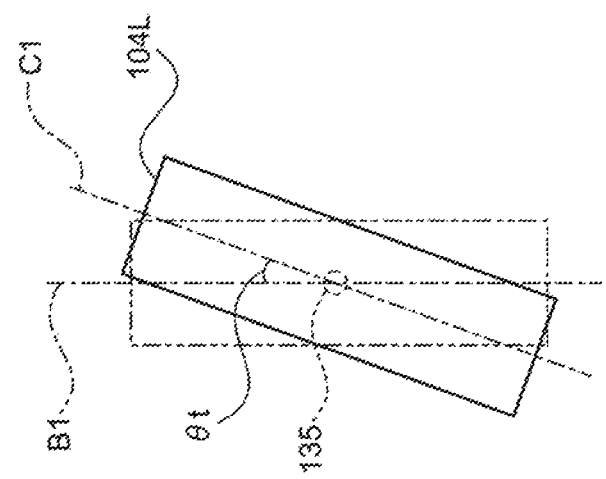
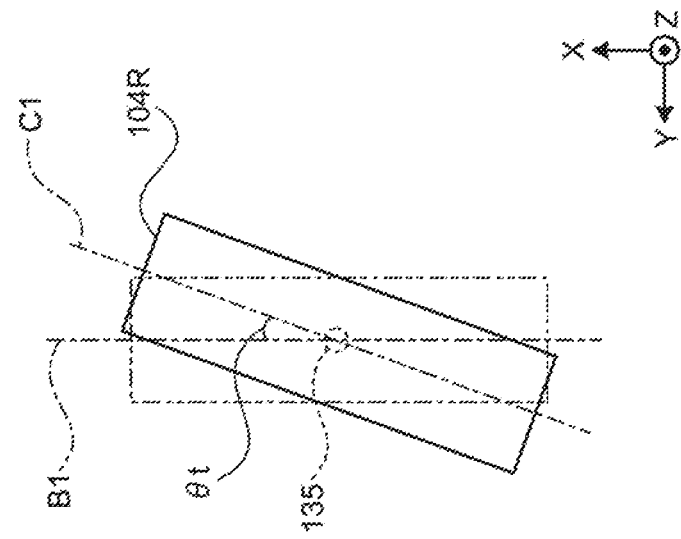
FIG.8

FIG.10
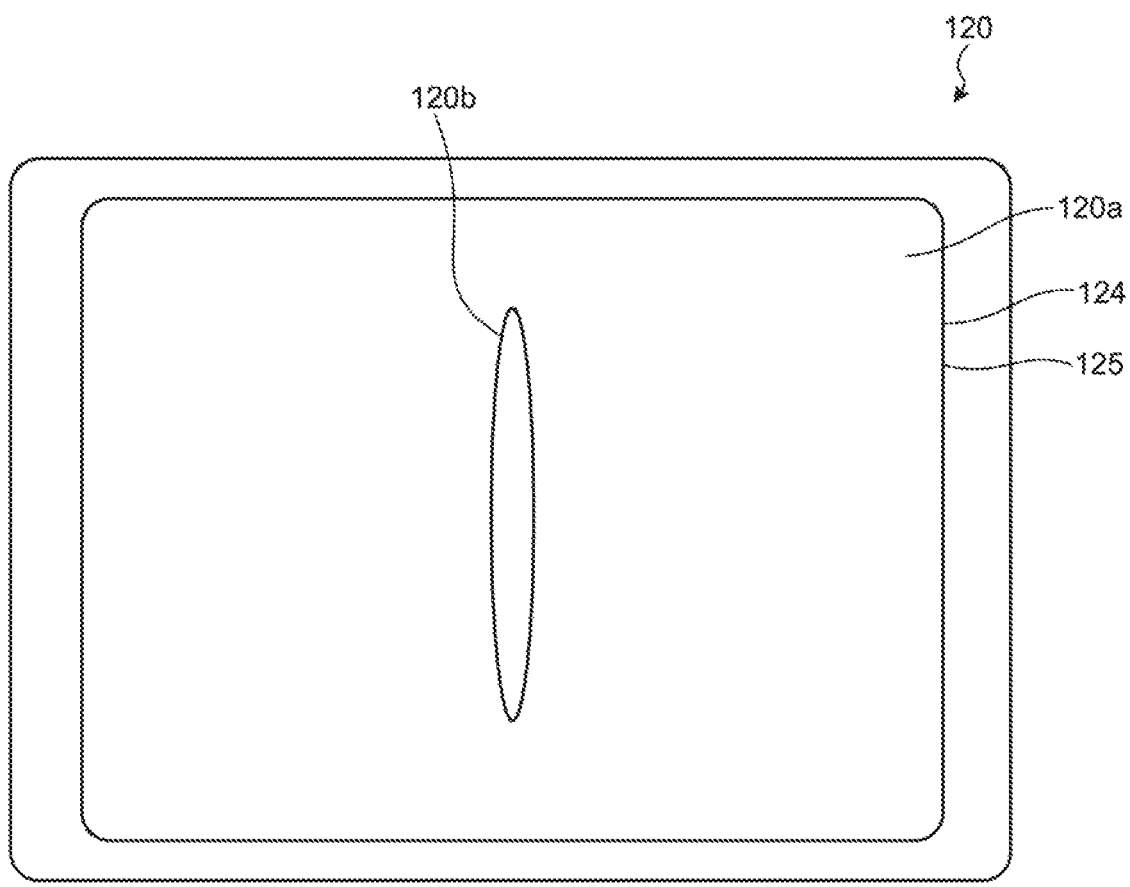
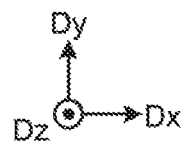

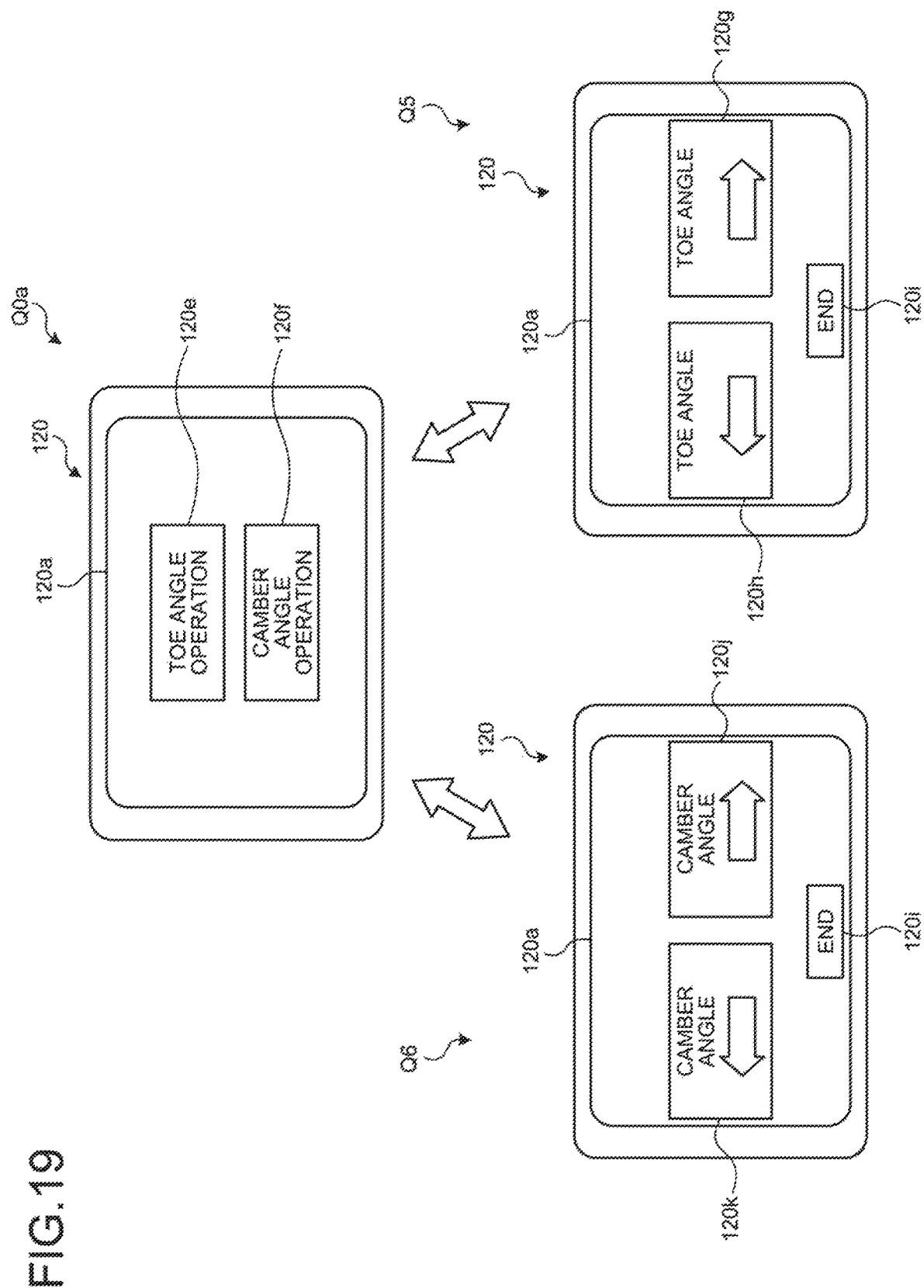

SUSPENSION OPERATION SYSTEM AND SUSPENSION OPERATION TERMINAL

CROSS-REFERENCE TO RELATED APPLICATION

This application is a National Stage of PCT international application Ser. No. PCT/JP2018/036255 filed on Sep. 28, 2018, which designates the United States, incorporated herein by reference, and which is based upon and claims the benefit of priority from Japanese Patent Application No. 2017-202530 filed on Oct. 19, 2017, the entire contents of which are incorporated herein by reference.

BACKGROUND

1. Technical Field

The present invention relates to a suspension operation system and a suspension operation terminal.

2. Description of the Related Art

A vehicle has a suspension provided between its body and a wheel. The suspension is a device that makes vibrations due to fluctuation of a road surface less likely to be transmitted to the vehicle body, and that positions the wheel. A multi-link suspension is known as one of suspension types. Prior Art 1, for example, describes an example of the multi-link suspension. Prior Art 2 describes a work vehicle operation system that performs remote control on a vehicle by using a portable information terminal such as a smartphone and a tablet terminal.

PRIOR ART

Prior Art 1: Japanese Laid-open Patent Publication No. 2015-155255
Prior Art 2: Japanese Patent No. 5955254

In some cases, a relative posture of the wheel with respect to the vehicle body is required to be changed in accordance with motion performance required for the vehicle. However, a conventional steering wheel has a small degree of freedom in operation, which leads to difficulty in operating a wheel posture with ease. Prior Art 2 does not describe suspension operation.

The present invention has been made in view of the above, and aims to provide a suspension operation system and a suspension operation terminal that can easily operate a relative posture of the wheel with respect to the vehicle body.

SUMMARY

To achieve the purpose described above, a suspension operation system according to an aspect of the present invention includes: a suspension that includes a plurality of links supporting a wheel, at least one or more of the links having an actuator increasing or decreasing a length of the actuator in an axial direction; a control device that supplies a drive signal to the actuator to control operation of the suspension; and a suspension operation terminal that operates the suspension. The suspension operation terminal includes: a detector that detects operation input information to the suspension operation terminal; and a communicator that transmits information about a target posture of the wheel, the information being based on the operation input information, to the control device as an operation command. The control device includes: a first calculator that calculates the length of the actuator on the basis of the operation command; and a drive circuit that produces the drive signal on the basis of information from the first calculator.

Accordingly, an operator can control the suspension including the plurality of extension-retraction links by operating the suspension operation terminal. Consequently, the degree of freedom in operating the suspension can be more increased than the conventional steering wheels. The suspension operation system can easily control the posture of the wheel by operating the suspension including the plurality of extension-retraction links.

As a preferred aspect of the suspension operation system, the suspension operation terminal includes a second calculator that calculates the operation command on the basis of the operation input information. The operation command includes information about at least one of a toe angle or a camber angle of the wheel. This makes it possible to control the toe angle and the camber angle of the wheel by the operation of the suspension operation terminal, thereby allowing an increased degree of freedom in operating the posture of the wheel.

As a preferred aspect of the suspension operation system, the suspension operation terminal further includes a display that displays an image. The detector includes a touch panel that detects touch input to a detection surface. The second calculator calculates the operation command by associating operation input information from the touch panel provided by slide operation performed on an operation indication body displayed on the detection surface with the camber angle of the wheel. Accordingly, the operator can control the camber angle of the wheel by operating the touch panel. The operator can determine whether the camber angle of the wheel is operated by performing the slide operation on the displayed operation indication body. Consequently, the suspension operation system can easily operate the camber angle of the wheel. The vehicle using the suspension operation system can adjust the motion performance of the vehicle by controlling the camber angles of the wheels in accordance with running conditions and running environments.

As a preferred aspect of the suspension operation system, the detector includes a sensor that detects rotation around a direction orthogonal to a detection surface of the suspension operation terminal, the direction serving as a rotation center axis. The second calculator calculates the operation command by associating a rotation angle of the suspension operation terminal, the rotation angle being obtained from the sensor, with the toe angle of the wheel. Accordingly, the operator can control the toe angle of the wheel by performing the rotation operation on the operation terminal. The suspension operation system associates the rotation operation of the suspension operation terminal with the toe angle of the wheel in the same manner as the operation of the conventional steering wheel, thereby making it possible to easily control the toe angle of the wheel.

As a preferred aspect of the suspension operation system, the communicator wirelessly transmits the operation command to the control device. This makes it possible for the suspension operation terminal to wirelessly communicate with the control device. Accordingly, the suspension operation terminal can be stored at a location where the suspension operation terminal does not interfere with occupants when the suspension operation terminal is not operated, such as a case where the vehicle is in an automatic drive mode, which improves comfortableness.

A suspension operation terminal according to another aspect of the present invention includes: a detector that detects operation input information for operating a suspension including a plurality of links supporting a wheel; and a communicator that wirelessly transmits information about a target posture of the wheel, the information being calculated on the basis of the operation input information, to a control device as an operation command. The suspension operation terminal operates a posture of the wheel by operating an actuator to increase or decrease a length of the actuator in an axial direction on the basis of the operation command, the actuator being included in at least one or more of the links.

Accordingly, the operator can control the suspension including the plurality of extension-retraction links by operating the suspension operation terminal. Consequently, the degree of freedom in operating the suspension can be more increased than the conventional steering wheels. Operating the suspension including the plurality of links with the operation terminal makes it possible to easily control the posture of the wheel.

As a preferred aspect of the suspension operation terminal, the suspension operation terminal further includes: a calculator that calculates the operation command on the basis of the operation input information; and a display that displays an image. The detector includes a touch panel that detects touch input to a detection surface. The display displays an operation indication body on the detection surface, the operation indication body being associated with a camber angle of the wheel. The calculator calculates the operation command by associating operation input information from the touch panel provided by slide operation performed on the operation indication body with the camber angle of the wheel. Accordingly, the operator can control the camber angle of the wheel by operating the touch panel. The operator can determine whether the camber angle of the wheel is operated by performing the slide operation on the displayed operation indication body. Consequently, the suspension operation terminal can easily operate the camber angle of the wheel.

According to the present invention, it is possible to easily operate the relative posture of the wheel with respect to the vehicle body.

BRIEF DESCRIPTION OF THE DRAWINGS

FIG. 8 is a diagram for explaining a toe angle of a wheel.

FIG. 10 is a plan view illustrating a suspension operation terminal in the embodiment.

FIG. 19 is a diagram for explaining another exemplary operation for operating the posture of the wheel by the suspension operation terminal.

DETAILED DESCRIPTION

The following describes the present invention in detail with reference to the accompanying drawings. The following embodiment for carrying out the invention (hereinafter described as the embodiment) does not limit the invention. The constituent elements in the embodiment described below include elements that can be easily conceived of by a person skilled in the art, elements substantially equivalent thereto, and elements within a so-called range of equivalents. The constituent elements disclosed in the following embodiment can be combined as appropriate.

Figure 1:
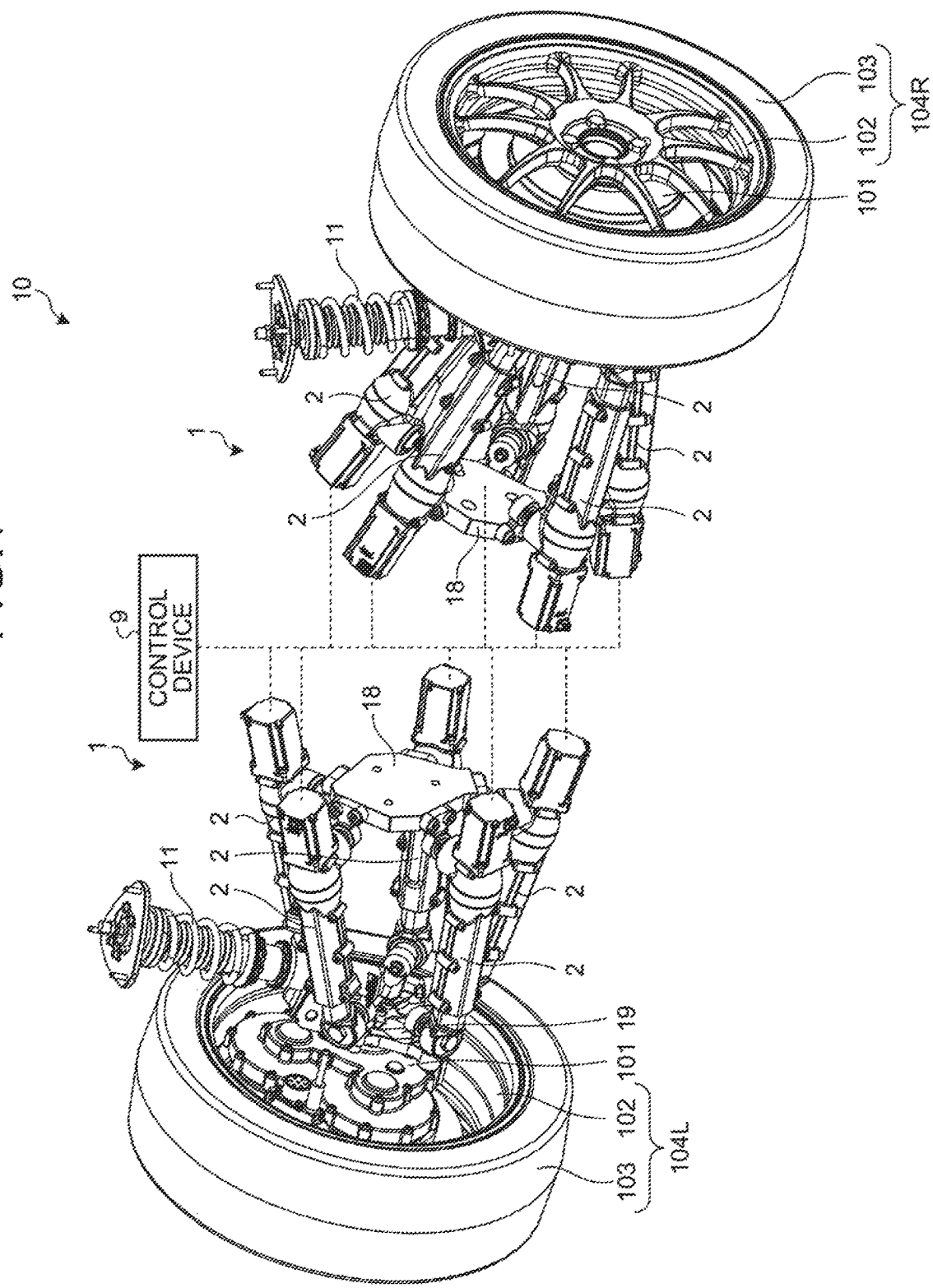
FIG. 1 is a perspective view of suspensions of a suspension operation system in an embodiment.
Figure 2:
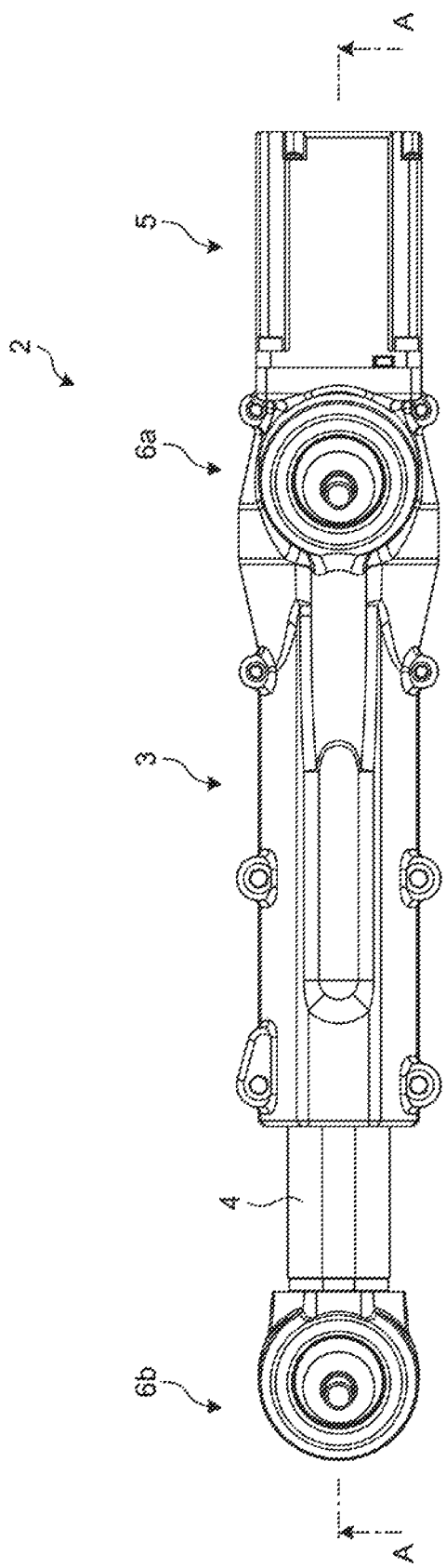
FIG. 2 is a plan view of an extension-retraction link of the suspension operation system in the embodiment.
Figure 3:
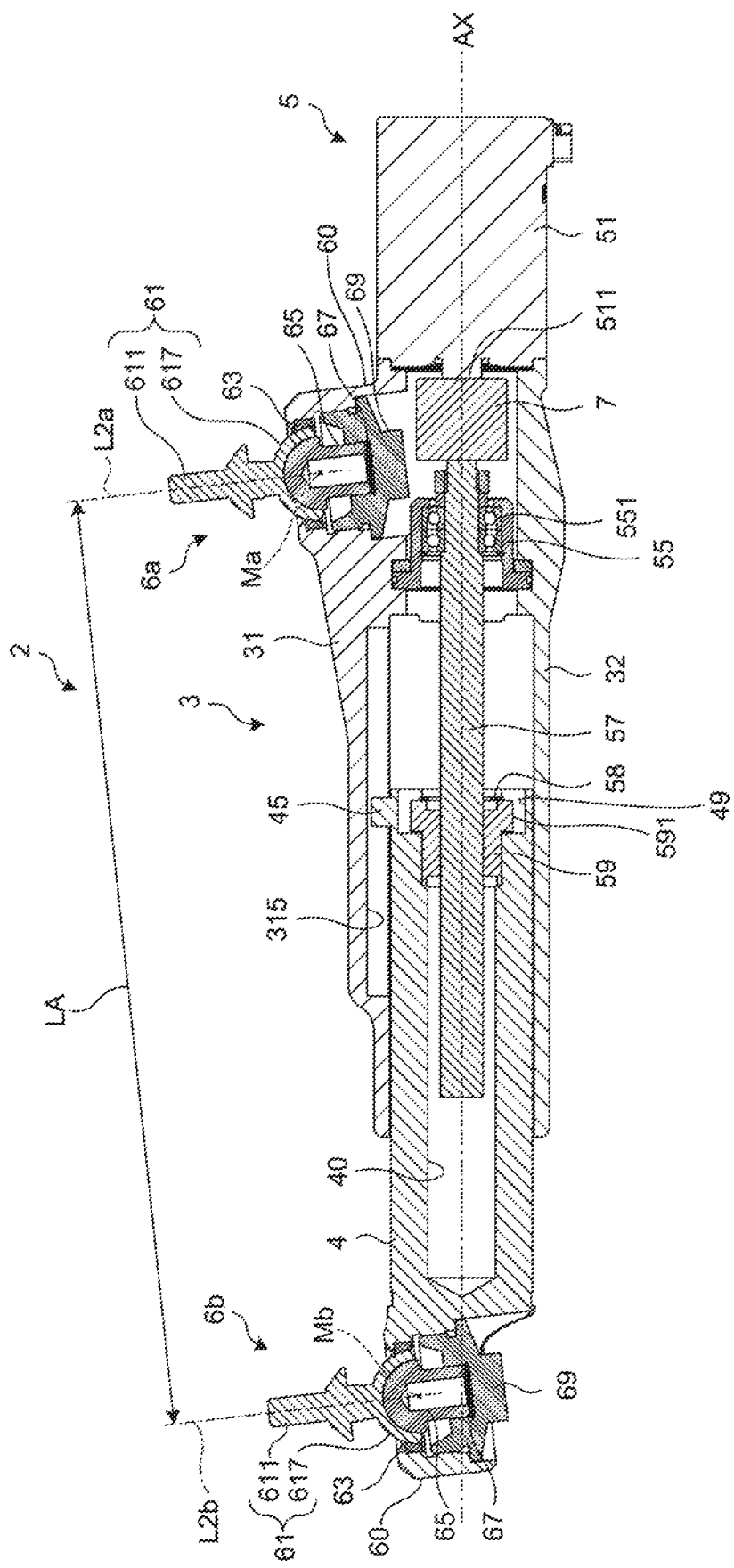
FIG. 3 is a cross-sectional view taken along A-A in FIG. 2.
Figure 4:
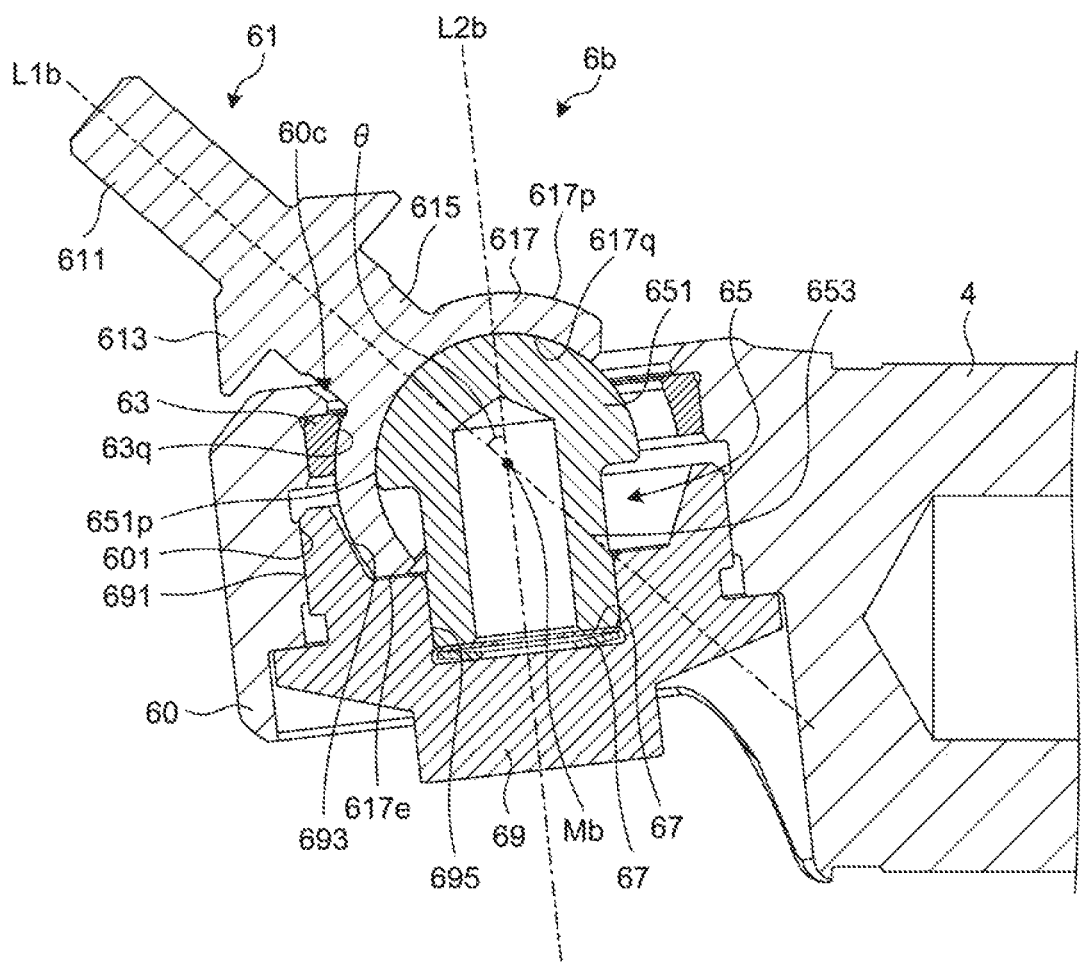
FIG. 4 is a cross-sectional view of a second universal joint.

FIG. 1 is a perspective view of suspensions of a suspension operation system in the embodiment. FIG. 2 is a plan view of an extension-retraction link of the suspension operation system according to the embodiment. FIG. 3 is a cross-sectional view taken along A-A in FIG. 2. FIG. 4 is a cross-sectional view of a second universal joint. A vehicle 10 in the embodiment includes wheels 102, hub units 101, vehicle body side members 18, hub carriers 19, suspensions 1, and a control device 9. For example, the vehicle 10 includes four wheels 102, each of which includes the hub unit 101.

The hub unit 101 has, for example, a hub bearing, two motors, and a speed changer, built-in. The hub unit 101 rotatably supports the wheel 102 and drives the wheel 102. The vehicle body side member 18 is fixed to the vehicle body. The hub carrier 19 is a member fixed to the hub unit 101. The hub carrier 19 is also called a knuckle.

The suspension 1 is a device that connects the vehicle body (chassis) of the vehicle 10 and the hub unit 101. The suspension 1 is a multi-link suspension. As illustrated in FIG. 1, the suspension 1 includes a shock absorber 11 and five extension-retraction links 2 for each wheel 102.

The shock absorber 11 is a device that reduces shock transmitted to the vehicle body from a road surface during vehicle running. One end of the shock absorber 11 is fixed to the vehicle body. The other end of the shock absorber 11 is fixed to the hub carrier 19. The shock absorber 11 can extend and retract in an upper-lower direction.

The extension-retraction link 2 connects the vehicle body side member 18 and the hub carrier 19. As illustrated in FIG. 1, two extension-retraction links 2 are arranged on an upper side of the rotation axis of the wheel 102. Three extension-retraction links 2 are arranged on a lower side of the rotation axis of the wheel 102. As illustrated in FIG. 2, the extension-retraction link 2 includes a stationary shaft 3, a movable shaft 4, a first universal joint 6a, a second universal joint 6b, and an actuator 5.

The stationary shaft 3 is connected to the vehicle body side member 18 (refer to FIG. 1) with the first universal joint 6a interposed therebetween. The stationary shaft 3 has a tubular shape. As illustrated in FIG. 3, the stationary shaft 3 includes a first member 31 and a second member 32. The first member 31 and the second member 32 are connected to each other with fastener members. The first universal joint 6a is attached to the first member 31.

The movable shaft 4 is connected to the hub carrier 19 (refer to FIG. 1) with the second universal joint 6b interposed therebetween. As illustrated in FIG. 3, the movable shaft 4 is a hollow member having an internal space 40. Part of the movable shaft 4 is located inside the stationary shaft 3. The movable shaft 4 can slide with respect to the stationary shaft 3. The slidable length of the movable shaft 4 is limited by a stopper 45 provided to the movable shaft 4. The stopper 45 is disposed in a groove 315 provided on an inner circumferential surface of the first member 31. When the stopper 45 reaches the end of the groove 315, the stopper 45 is in contact with the first member 31, thereby stopping the movable shaft 4. This prevents the movable shaft 4 from dropping off from the stationary shaft 3.

The first universal joint 6a connects the stationary shaft 3 to the vehicle body side member 18 (refer to FIG. 1) such that the stationary shaft 3 can rotate and swing with respect to the vehicle body side member 18. The second universal joint 6b connects the movable shaft 4 to the hub carrier 19 (refer to FIG. 1) such that the movable shaft 4 can rotate and swing with respect to the hub carrier 19. In the description about the capability of rotation and swing, the rotation means rotation around a straight line L1$b$ (refer to FIG. 4) serving as the rotation center, while the swing means movement by which an angle θ made between the straight line L1$b$ and a straight line L2$b$ changes. The straight line L1$b$ is a straight line passing through the gravity center of each cross-sectional surface when an arm 61, which is described later, is cut with a plane orthogonal to the longitudinal direction of the arm 61. The straight line L2$b$ is orthogonal to a circle formed by an outer shape of an external bush 63, which is described later, and passes through the center of the circle. An intersection Mb (refer to FIG. 14) of the straight lines L1$b$ and L2$b$ is the center of an arm convex surface 617$p$ having a spherical surface shape, which is described later. In the embodiment, the first universal joint 6a and the second universal joint 6b have the same structure. In the following detailed description, the second universal joint 6b is described as an example. The description of the second universal joint 6b can also be applied to that of the first universal joint 6a.

As illustrated in FIGS. 3 and 4, the second universal joint 6b includes a housing 60, the arm 61, the external bush 63, an internal bush 65, elastic members 67, and a supporting member 69. The housing 60 is formed integrally with the end portion of the movable shaft 4. The housing 60 has a tubular shape. The housing 60 of the first universal joint 6a is formed integrally with the first member 31.

The arm 61 is a member connected to the hub carrier 19 (refer to FIG. 1). The arm 61 is made of metal. The metal used for the arm 61 is steel, for example. Part of the arm 61 is located inside the housing 60. As illustrated in FIG. 4, the arm 61 includes a fastening portion 611, a flange portion 613, an intermediate portion 615, and a sliding portion 617.

The fastening portion 611 and the flange portion 613 are located outside the housing 60. The fastening portion 611 is a columnar member having a thread on its outer circumferential surface. The flange portion 613 is a member that is located on the housing 60 side of the fastening portion 611 and has a substantially conical shape in which the diameter of the flange portion 613 increases toward the housing 60. The intermediate portion 615 is a member that extends toward the housing 60 side from the flange portion 613 and has a substantially columnar shape. The intermediate portion 615 has two parallel flat surfaces on its outer circumferential surface. The sliding portion 617 is a member that is located on the housing 60 side of the intermediate portion 615 and has a substantially hemispherical shape. The sliding portion 617 includes the arm convex surface 617$p$, an arm concave surface 617$q$, and an arm end surface 617$e$. The arm convex surface 617$p$ is the external surface of the sliding portion 617 and has a spherical surface shape. The arm concave surface 617$q$ is the internal surface of the sliding portion 617 and has a spherical surface shape. The center of the arm concave surface 617$q$ is the same as the center of the arm convex surface 617$p$. The arm end surface 617$e$ is the end surface of the sliding portion 617 that connects the arm convex surface 617$p$ and the arm concave surface 617$q$. Part of the arm end surface 617$e$ is formed in a conical surface shape.

As illustrated in FIG. 4, the external bush 63 is an annular member located between the inner circumferential surface of the housing 60 and the arm 61. The external bush 63 is formed of metal. The metal used for the external bush 63 is brass, for example. The external bush 63 is press-fitted into the housing 60. The external bush 63 includes a bush concave surface 63$q$ serving as its inner circumferential surface. The bush concave surface 63$q$ has a spherical surface shape and is in contact with the arm convex surface 617$p$. The center and the radius of the bush concave surface 63$q$ are the same as those of the arm convex surface 617$p$.

As illustrated in FIG. 4, the internal bush 65 is located inside the sliding portion 617 of the arm 61. The internal bush 65 is located on the opposite side of the external bush 63 with respect to the sliding portion 617. The internal bush 65 is formed of metal. The metal used for the internal bush 65 is brass, for example. The internal bush 65 includes a head portion 651 and a body portion 653. The head portion 651 has a substantially hemispherical shape and a bush convex surface 651$p$. The bush convex surface 651$p$ is a spherical surface and in contact with the arm concave surface 617$q$. Accordingly, the sliding portion 617 is sandwiched between the bush convex surface 651$p$ of the internal bush 65 and the bush concave surface 63$q$ of the external bush 63. The center and the radius of the bush convex surface 651$p$ are the same as those of the arm concave surface 617$q$. The body portion 653 is a substantially cylindrical member extending from the head portion 651 toward the opposite side of the bush convex surface 651$p$.

The supporting member 69 supports the internal bush 65. As illustrated in FIG. 4, the supporting member 69 is attached inside the housing 60. The supporting member 69 is formed of metal. The metal used for the supporting member 69 is steel, for example. The supporting member 69 includes a male screw 691, a first recess 693, and a second recess 695. The male screw 691 engages with a female screw 601 provided to the housing 60. The first recess 693 is a dent that opens toward the internal bush 65 and has a truncated cone shape. The bottom surface of the first recess 693 is a plane orthogonal to the extending direction of the body portion 653 of the internal bush 65. The second recess 695 is a dent that is provided on the bottom surface of the first recess 693 and has a columnar shape. The body portion 653 is fitted in the second recess 695 and guided by the inner circumferential surface of the second recess 695.

As illustrated in FIG. 4, the elastic members 67 are located between the internal bush 65 and the supporting member 69 and press the internal bush 65 toward the arm 61. The elastic member 67 is a disc spring, for example. Two elastic members 67 are arranged overlapping with each other between the body portion 653 and the bottom surface of the second recess 695.

The inside of the housing 60 is filled with lubricant. The lubricant is grease, for example. The sliding portion 617 of the arm 61 can move along the external bush 63 and the internal bush 65. Accordingly, the arm 61 can rotate and swing relatively with respect to the external bush 63 and the internal bush 65. As illustrated in FIG. 4, the arm end surface 617e is in contact with the bottom surface of the first recess 693. When the arm end surface 617e is in contact with the bottom surface of the first recess 693, a gap 60c is formed between the arm 61 and the housing 60.

The materials used for the respective first universal joint 6a and second universal joint 6b are not limited to those described above. The number of elastic members 67 included in the first universal joint 6a and the second universal joint 6b is not limited to any specific number. The number may be one or three or more. The first universal joint 6a and the second universal joint 6b do not necessarily have the same structure.

As illustrated in FIG. 3, the actuator 5 includes a motor 51, a screw shaft 57, a bearing unit 55, a nut 59, a snap ring 58, and a clutch 7.

The motor 51 is fixed to the end portion of the stationary shaft 3 on the opposite side of the movable shaft 4. The motor 51 includes an encoder that detects a rotation angle of a rotor. A shaft 511 that rotates together with the rotor of the motor 51 extends toward the inside of the stationary shaft 3.

The screw shaft 57 is connected to the shaft 511 with the clutch 7 interposed therebetween. The screw shaft 57 rotates together with the shaft 511 around a rotation axis AX serving as the rotation center. Part of the screw shaft 57 is inserted into the movable shaft 4. The end of the screw shaft 57 is located in the internal space 40 of the movable shaft 4. The screw shaft 57 passes through the nut 59.

The bearing unit 55 supports the screw shaft 57 such that the screw shaft 57 can rotate with respect to the stationary shaft 3. The bearing unit 55 is fixed to the stationary shaft 3 and has bearings 551 built-in. The bearings 551 are fitted in the outer circumferential surface of the screw shaft 57.

The nut 59 is fixed to the movable shaft 4 with the snap ring 58 and moves together with the movable shaft 4. The nut 59 includes two protrusions 591 protruding in the radius direction. The protrusions 591 are fitted in a recess 49 provided on the end surface of the movable shaft 4. This restricts the rotation of the nut 59. The snap ring 58 is fitted in a substantially annular groove provided on the inner circumferential surface of the movable shaft 4 and positions the nut 59 in the axial direction.

The control device 9 illustrated in FIG. 1 is a computer, which includes a central processing unit (CPU), a read only memory (ROM), and a random access memory (RAM), for example. The control device 9 is an electronic control unit (ECU) mounted on the vehicle 10, for example. The control device 9 is electrically connected to the motor 51 of each extension-retraction link 2. The control device 9 controls the motors 51 individually. As a result, the length of each extension-retraction link 2 (position of each movable shaft 4) changes.

In the embodiment, the length of the extension-retraction link 2 is described as an actuator length LA illustrated in FIG. 3. The actuator length LA is a length between an intersection Ma of the first universal joint 6a and an intersection Mb of the second universal joint 6b. The first universal joint 6a can swing around the intersection Ma serving as the swing center. The second universal joint 6b can swing around the intersection Mb serving as the swing center.

Figure 5:
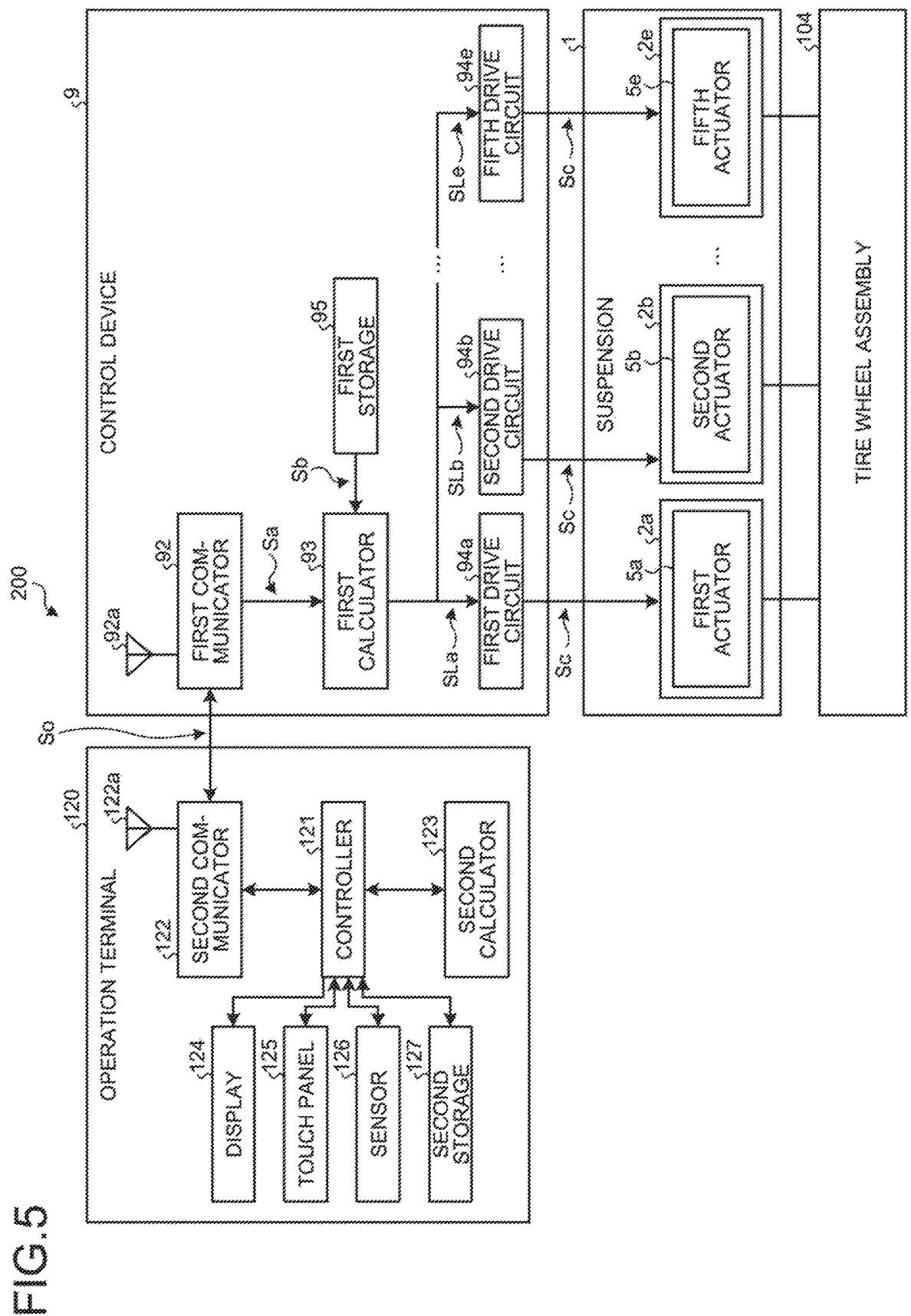
FIG. 5 is a block diagram illustrating a schematic structure of the suspension operation system in the embodiment.

The following describes a suspension operation system 200 that operates the suspension 1 including the plurality of extension-retraction links 2. FIG. 5 is a block diagram illustrating a schematic structure of the suspension operation system according to the embodiment. The suspension operation system 200 illustrated in FIG. 5 has the suspension 1, tire wheel assemblies 104L and 104R, the control device 9, and an operation terminal 120.

The suspension 1 has the structure illustrated in FIGS. 1 to 3. The suspension 1 has a plurality of extension-retraction links, i.e., a first extension-retraction link 2a, a second extension-retraction link 2b, . . . , and a fifth extension-retraction link 2e. The first extension-retraction link 2a, the second extension-retraction link 2b, . . . , and the fifth extension-retraction link 2e are simply described as the extension-retraction link 2 when they do not need to be described individually. The first extension-retraction link 2a, the second extension-retraction link 2b, . . . , and the fifth extension-retraction link 2e have a first actuator 5a, a second actuator 5b, . . . , and a fifth actuator 5e, respectively. The first actuator 5a, the second actuator 5b, . . . , and the fifth actuator 5e are simply described as the actuator 5 when they do not need to be described individually. Operation of each actuator 5 increases or decreases the length in the axial direction of the extension-retraction link 2.

The control device 9 supplies a drive signal Sc to the actuator 5 to control the operation of the suspension 1. Accordingly, the control device 9 can control the postures of the tire wheel assemblies 104L and 104R. FIG. 5 illustrates a tire wheel assembly 104, which is one of the tire wheel assemblies, for easy explanation. As illustrated in FIG. 1, the control device 9 is provided for the two tire wheel assemblies 104L and 104R. Accordingly, the control device 9 can control the postures of the two tire wheel assemblies 104L and 104R in conjunction with each other. The control is not limited to this example. The control device 9 may control the posture of the tire wheel assembly 104 individually. Alternatively, the control device 9 can be provided for three or more suspensions 1 and control the plurality of suspensions 1 and the tire wheel assemblies 104.

The control device 9 includes a first communicator 92, a first calculator 93, a first drive circuit 94a, a second drive circuit 94b, . . . , a fifth drive circuit 94e, and a first storage 95.

The first communicator 92, which is a wireless communication module, wirelessly receives, via an antenna 92a, an operation command So transmitted from a second communicator 122 of the operation terminal 120. The first communicator 92 demodulates the operation command So, which is a high frequency signal, to produce a target posture signal Sa. The first communicator 92 supplies the target posture signal Sa to the first calculator 93. The target posture signal Sa is information about a target posture of the tire wheel assembly 104. The target posture signal Sa is information about a toe angle θt (refer to FIG. 8) and a camber angle θc (refer to FIG. 9), for example. The wireless communication between the control device 9 and the operation terminal 120 uses a communication standard such as Wi-Fi (trademark), 3G, and Bluetooth (trademark). The communication standard is not limited to any specific standard, and may be another standard.

The first storage 95 includes a storage medium such as a ROM. The first storage 95 stores actuator information Sb, which is information about each actuator 5. The actuator information Sb is information about a maximum value of the actuator length LA, a minimum value of the actuator length LA, a relation between the actuator length LA and the posture of the tire wheel assembly 104, for example. The first storage 95 may store information such as an ID or a password of the operation terminal 120. In this case, the control device 9 collates the information such as the ID or the password stored in the first storage 95 with an ID or a password transmitted from the operation terminal 120 to determine whether the operation terminal 120 is an operable terminal.

The first calculator 93 includes a CPU, for example. The first calculator 93 calculates length command signals SLa, SLb, . . . , and SLe on the basis of the target posture signal Sa and the actuator information Sb. The length command signals SLa, SLb, . . . , and SLe are information about the actuator lengths LA of the respective actuators 5, the actuator lengths LA causing the tire wheel assembly 104 to achieve the target posture (the toe angle θt and the camber angle θc). The first calculator 93 outputs the length command signals SLa, SLb, . . . , and SLe to the first drive circuit 94a, the second drive circuit 94b, . . . , and the fifth drive circuit 94e, respectively.

The first drive circuit 94a, the second drive circuit 94b, . . . , and the fifth drive circuit 94e produce the drive signals Sc on the basis of the length command signals SLa, SLb, . . . , and SLe, respectively, output from the first calculator 93. The first drive circuit 94a, the second drive circuit 94b, . . . , and the fifth drive circuit 94e output the drive signals Sc to the respective actuators 5. The first drive circuit 94a, the second drive circuit 94b, . . . , and the fifth drive circuit 94e are provided for the first extension-retraction link 2a, the second extension-retraction link 2b, . . . , and the fifth extension-retraction link 2e, respectively.

The motor 51 of the actuator 5 operates on the basis of the drive signal Sc. The actuator length LA of each extension-retraction link 2 increases and decreases. In this way, the control device 9 can perform control on the tire wheel assembly 104 to achieve the target posture by changing the actuator length LA of each extension-retraction link 2 on the basis of the operation command So.

The operation terminal 120 is a portable information terminal such as a smartphone or a tablet terminal, for example. The operation terminal 120 includes a controller 121, the second communicator 122, a second calculator 123, a display 124, a touch panel 125, a sensor 126, and a second storage 127.

The controller 121 is a circuit that controls operation of each of the second communicator 122, the second calculator 123, the display 124, the touch panel 125, the sensor 126, and the second storage 127. The controller 121 includes a CPU, for example.

The display 124 displays, on a display screen, information necessary to operate the operation terminal 120. The display 124 can employ a liquid crystal display panel or an organic light emitting diode (OLED) panel, for example.

The touch panel 125 and the sensor 126 are detectors that detect operation input information to the operation terminal 120. The touch panel 125, which is disposed overlapping with the display 124, detects a finger, a pen type input device, or the like that is in proximity to or in contact with a detection surface 120a (refer to FIG. 10). The touch panel 125 outputs the position of a finger that is in proximity to or in contact with the detection surface 120a to the controller 121 as the operation input information, for example. The touch panel 125 employs a capacitance detection method for detecting a finger or the like, on the basis of a change in capacitance. The touch panel 125 may employ another detection method.

The sensor 126, which includes an acceleration sensor and a gyroscope sensor, for example, detects the posture, such as a rotation angle, of the operation terminal 120. The sensor 126 outputs detection signals from various sensors to the controller 121 as the operation input information. The controller 121 controls a display image of the display 124 on the basis of the operation input information from the touch panel 125 and the sensor 126. While the touch panel 125 and the sensor 126 are described as the detectors in the embodiment, the detectors may be mechanical buttons, for example.

The second storage 127 stores in advance a relation between the operation input information to the operation terminal 120 and the posture of the tire wheel assembly 104. The second calculator 123 calculates the operation command So from the operation input information from the touch panel 125 and the sensor 126. The operation command So is information about the target posture based on the operation input information of the tire wheel assembly 104. The second calculator 123 outputs the operation command So to the controller 121.

The second communicator 122, which is a wireless communication module, modulates the operation command So from the controller 121 to a high frequency signal, and wirelessly transmits the high frequency signal to the control device 9 via an antenna 122a. While the above describes the case where the second communicator 122 performs transmission and the first communicator 92 performs reception, the first communicator 92 may further include a transmission function and the second communicator 122 may further include a reception function.

The structure described above allows an operator to control the posture of the tire wheel assembly 104 by operating the touch panel 125 of the operation terminal 120 or performing rotation operation on the operation terminal 120. Because the operation terminal 120 is wirelessly connected to the control device 9, the operation terminal 120 can be stored at a location where the operation terminal 120 does not interfere with occupants when the operation terminal 120 is not operated, such as a case where the vehicle is in an automatic drive mode.

Figure 6:
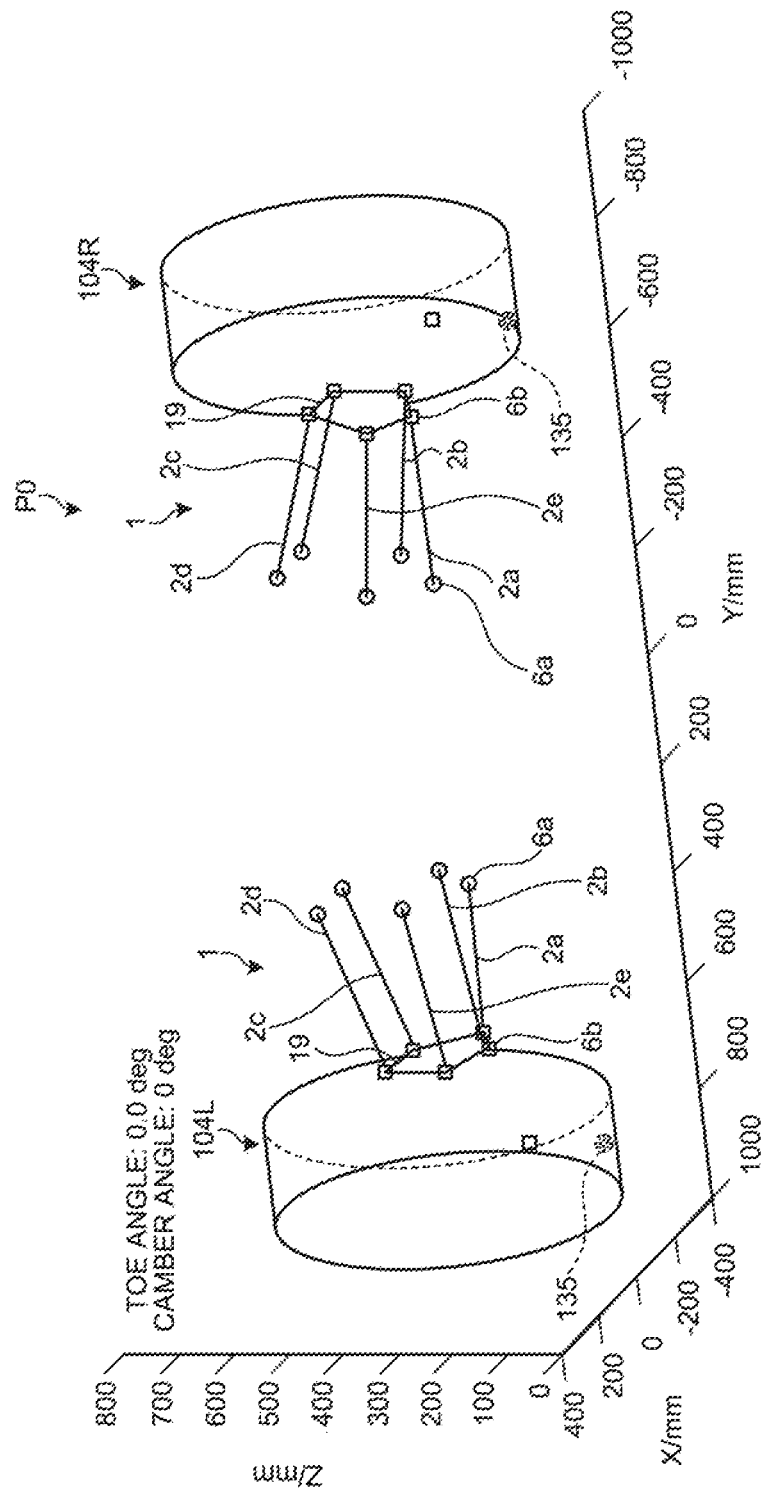
FIG. 6 is a diagram for explaining a relation between a length of an actuator and a posture of a tire wheel assembly.

The following describes an exemplary relation between the operation of the operation terminal 120 and the posture of the tire wheel assembly 104. FIG. 6 is a diagram for explaining a relation between the actuator length and the posture of the tire wheel assembly. FIG. 6 schematically illustrates the extension-retraction links 2, the first universal joints 6a, and the second universal joints 6b and the like of each of the suspensions 1. Two extension-retraction links 2 are arranged on the upper side of the rotation axis of the wheel 102. The first extension-retraction link 2a, the second extension-retraction link 2b, and the fifth extension-retraction link 2e are arranged on the lower side of the rotation axis of the tire wheel assembly 104. The third extension-retraction link 2c and the fourth extension-retraction link 2d are arranged on the upper side of the rotation axis of the tire wheel assembly 104.

An X direction illustrated in FIG. 6 is in parallel with a traveling direction of the vehicle. A Y direction, which is orthogonal to the X direction, is in parallel with the rotation axis of the tire wheel assembly 104 at a reference posture P0. The Z direction is orthogonal to the X direction and the Y direction.

At the reference posture P0 illustrated in FIG. 6, the toe angle θt of each of the tire wheel assemblies 104L and 104R is 0° while the camber angle θc of each of the tire wheel assemblies 104L and 104R is 0°. At the reference posture P0, the control device 9 outputs the drive signal Sc to each extension-retraction link 2 on the basis of the operation command So from the operation terminal 120. Accordingly, the actuator length LA of each extension-retraction link 2 increases and decreases. At the reference posture P0, the actuator length LA of the tire wheel assembly 104L on the left side and that of the tire wheel assembly 104R on the right side are equal.

Figure 7:
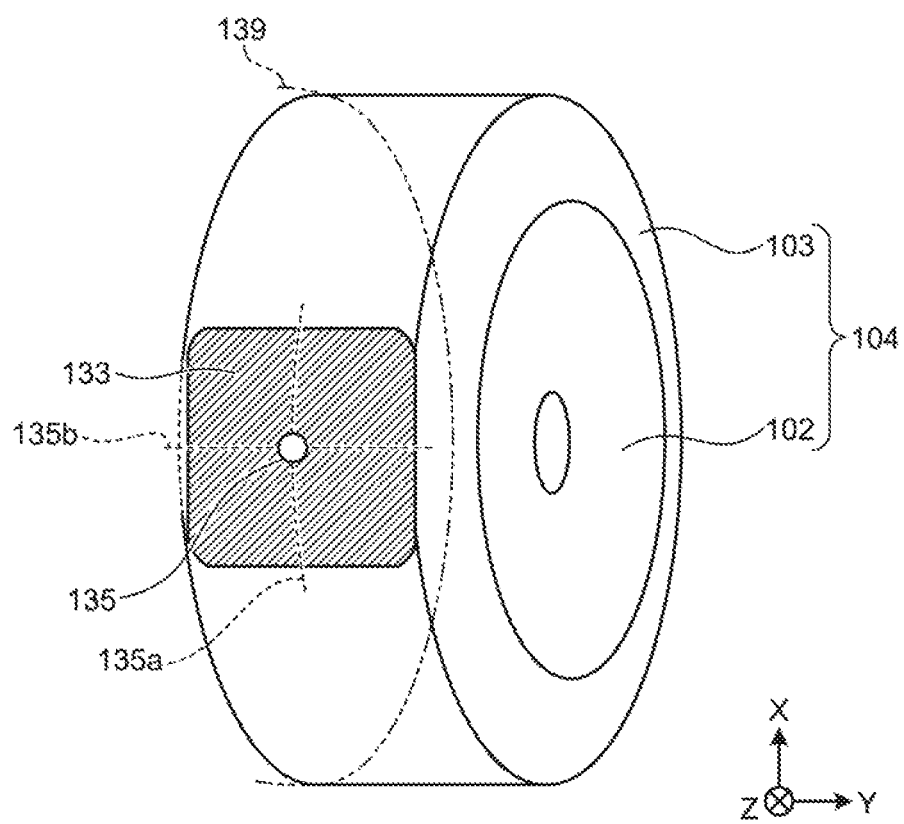
FIG. 7 is a diagram for explaining a contact patch center.
Figure 9:
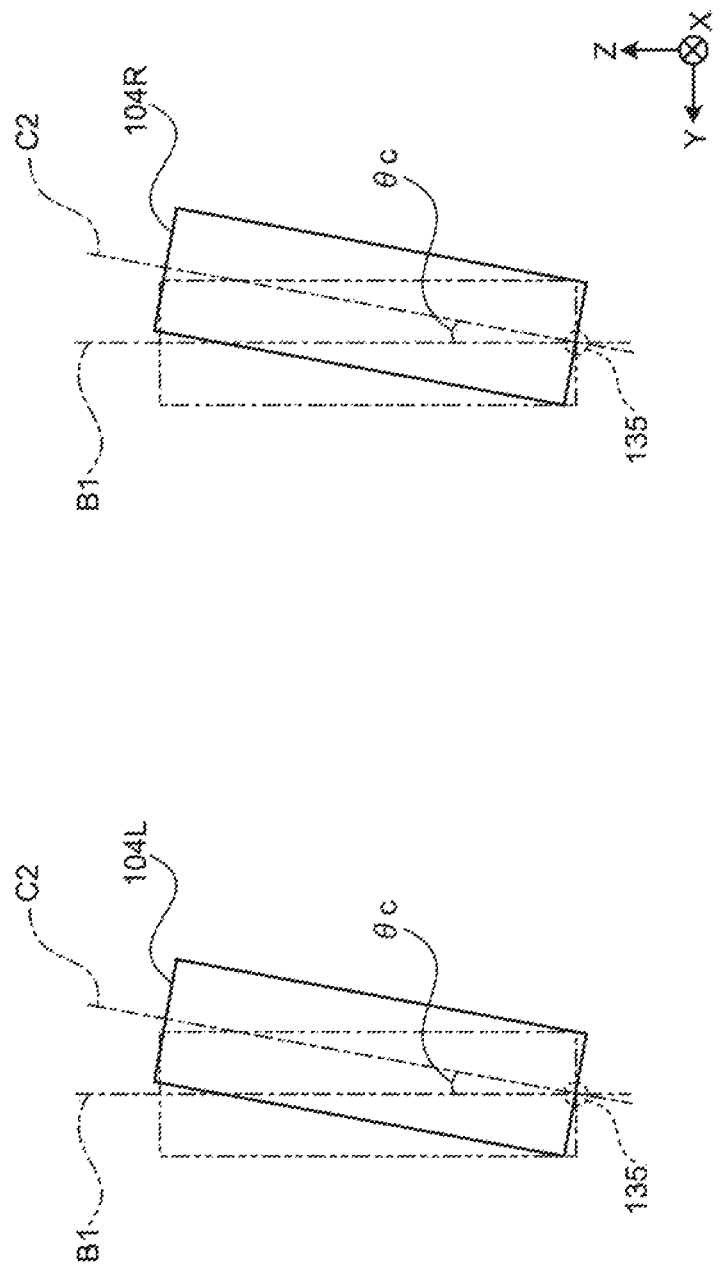
FIG. 9 is a diagram for explaining a camber angle of the wheel.

The following describes the toe angle θt and the camber angle θc of the tire wheel assembly 104 with reference to FIGS. 7 to 9. FIG. 7 is a diagram for explaining a contact patch center. FIG. 7 is a perspective view of the tire wheel assembly 104 in the Z direction when viewed from a road surface side. As illustrated in FIG. 7, a contact surface (contact patch) 133, at which a tire 103 of the tire wheel assembly 104 is in contact with a road surface 139, has a substantially rectangular shape. The area of the contact surface 133 changes depending on load in the Z direction such as a weight of the vehicle.

A point located at the center in the X direction of the contact surface 133 and at the center in the Y direction of the contact surface 133 is referred to as a gravity center point (contact patch center) 135. In other words, the gravity center point 135 is the intersection of a first center line 135a and a second center line 135b. The first center line 135a is a virtual line connecting the middle points of two sides along the Y direction of the contact surface 133. The second center line 135b is a virtual line connecting the middle points of two sides along the X direction of the contact surface 133.

FIG. 8 is a diagram for explaining the toe angle of the wheel. FIG. 8 schematically illustrates the tire wheel assemblies 104L and 104R when viewed from the Z direction. FIG. 8 illustrates the tire wheel assemblies 104L and 104R at the reference posture P0 with two-dot chain lines, and illustrates the tire wheel assemblies 104L and 104R in a state of being tilted at the toe angle θt from the reference posture P0 with solid lines. As illustrated in FIG. 8, the toe angle θt is an angle made between a reference surface B1 and a reference surface C1. The reference surface B1 is a surface that passes through the gravity center point 135 and is orthogonal to the rotation axis of each of the tire wheel assemblies 104L and 104R at the reference posture P0. The reference surface C1 is a surface that passes through the gravity center point 135 and is orthogonal to the rotation axis of each of the tire wheel assemblies 104L and 104R when the tire wheel assemblies 104L and 104R rotate around the Z direction serving as the rotation center in the state where the position of the gravity center point 135 is fixed.

FIG. 9 is a diagram for explaining the camber angle of the wheel. FIG. 9 schematically illustrates the tire wheel assemblies 104L and 104R when viewed from the X direction, and illustrates the tire wheel assemblies 104L and 104R at the reference posture P0 with two-dot chain lines. FIG. 9 illustrates the tire wheel assemblies 104L and 104R in a state of being tilted at the camber angle θc from the reference posture P0 with solid lines. As illustrated in FIG. 9, the camber angle θc is an angle made between the reference surface B1 and a reference surface C2. The reference surface C2 passes through the gravity center point 135 and is orthogonal to the rotation axis of each of the tire wheel assemblies 104L and 104R when the tire wheel assemblies 104L and 104R are tilted around the X direction serving as the rotation center in a state where the position of the gravity center point 135 is fixed.

Figure 11:
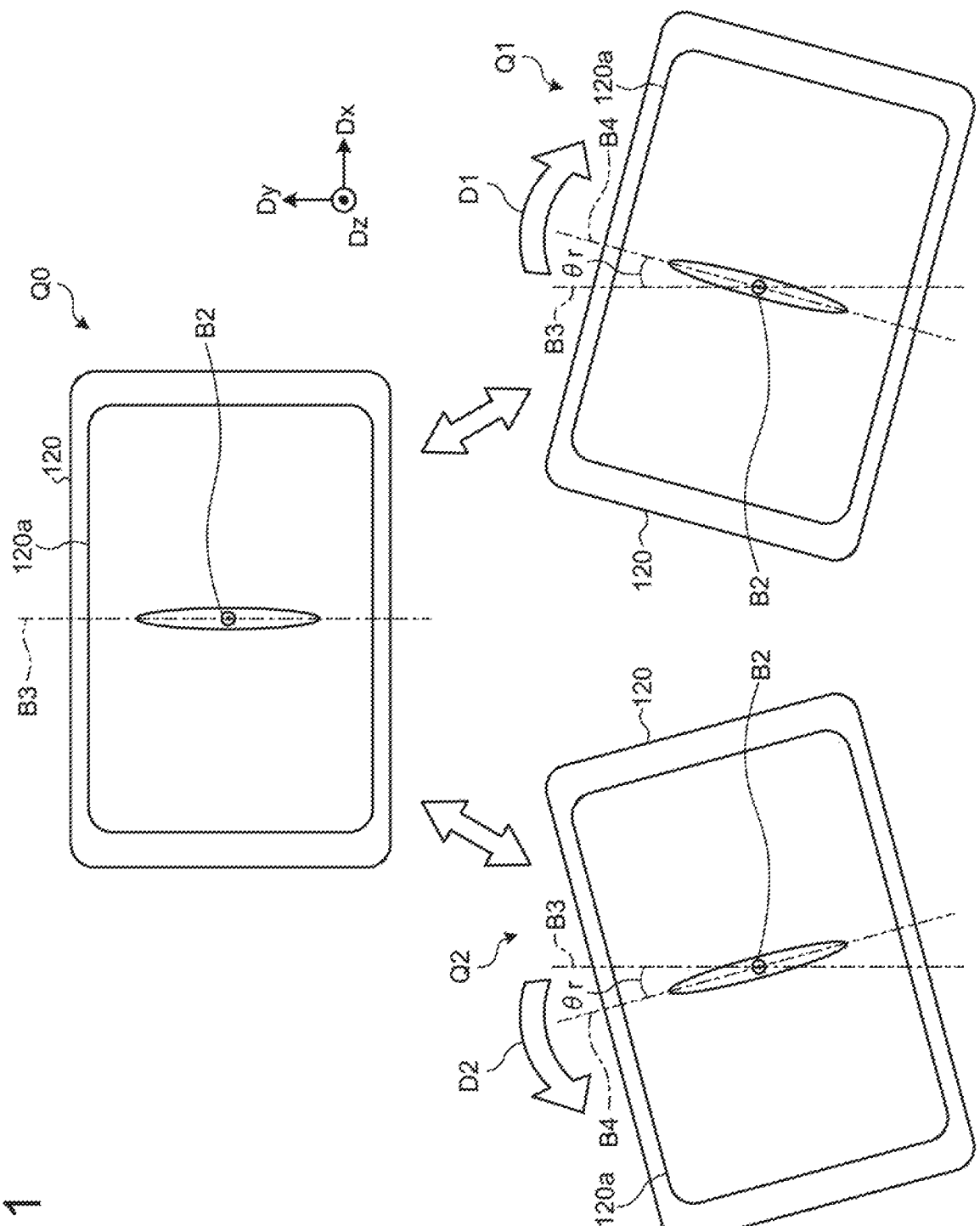
FIG. 11 is a diagram for explaining exemplary operation for operating the toe angle of the tire wheel assembly by the suspension operation terminal.
Figure 12:
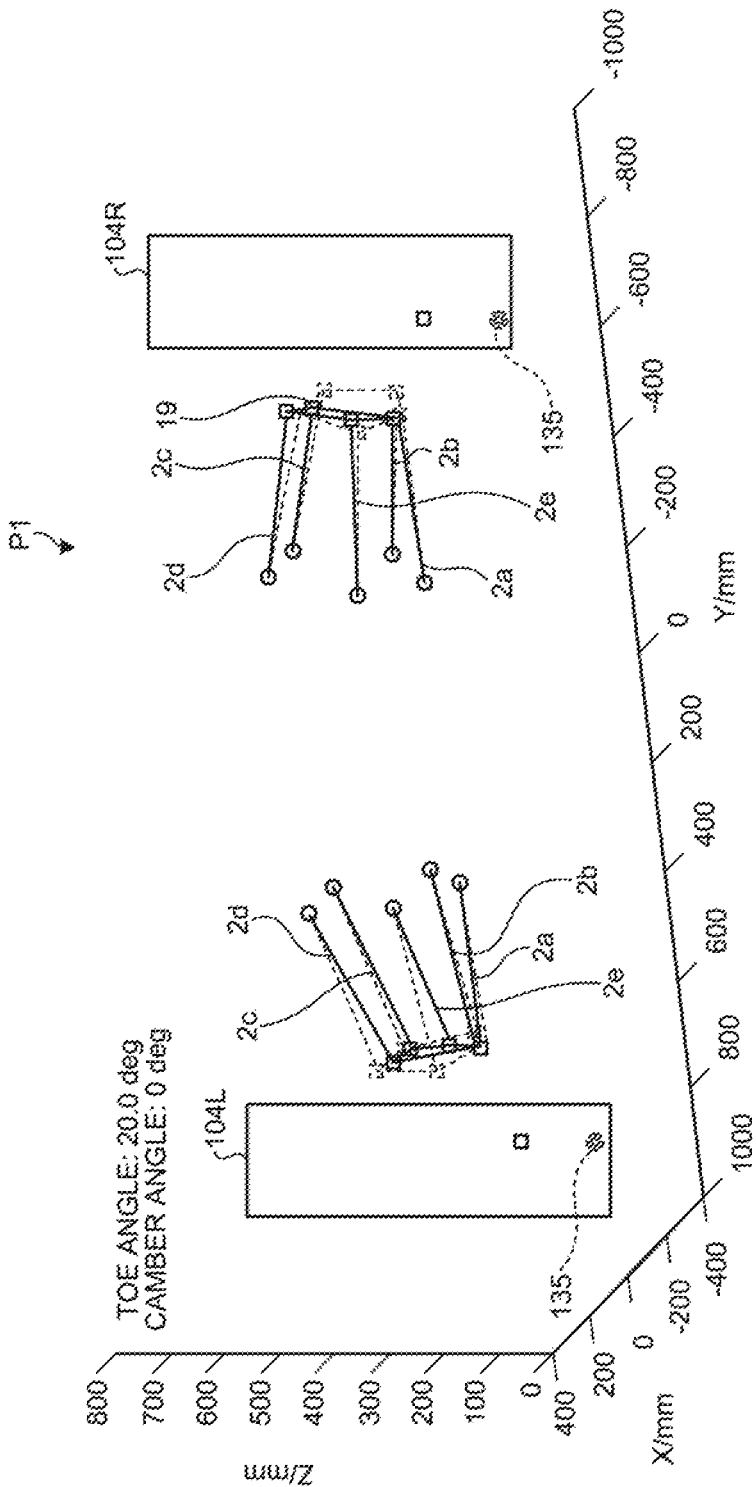
FIG. 12 is a diagram for explaining a relation between the tire wheel assembly and the suspension when the toe angle is 20°.
Figure 13:
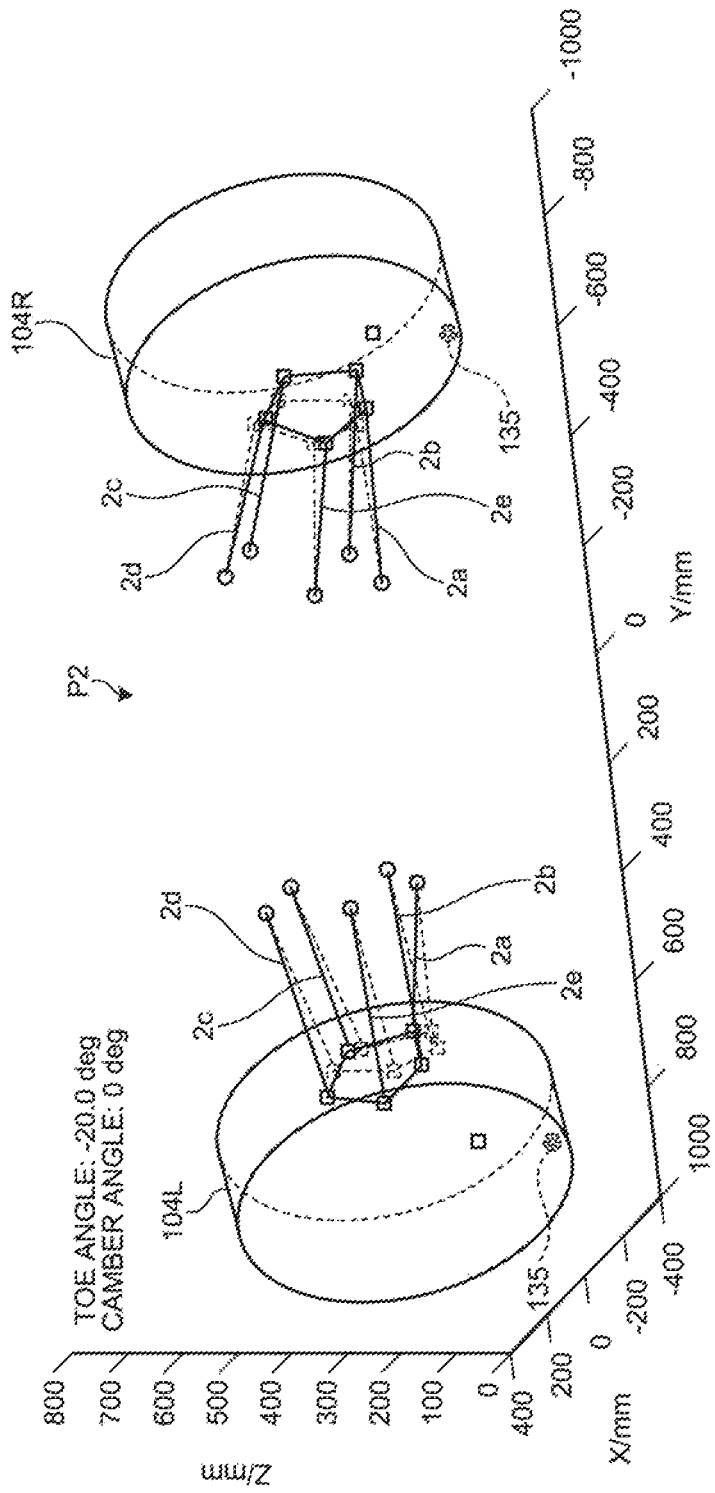
FIG. 13 is a diagram for explaining a relation between the tire wheel assembly and the suspension when the toe angle is −20°.

The following describes a method for controlling the toe angle θt of the tire wheel assembly 104 by operating the operation terminal 120 with reference to FIG. 5 and FIGS. 10 to 13. FIG. 10 is a plan view illustrating the suspension operation terminal according to the embodiment. FIG. 11 is a diagram for explaining exemplary operation for operating the toe angle of the tire wheel assembly by the suspension operation terminal. FIG. 12 is a diagram for explaining a relation between the tire wheel assembly and the suspension when the toe angle is 20°. FIG. 13 is a diagram for explaining a relation between the tire wheel assembly and the suspension when the toe angle is −20°.

As illustrated in FIG. 10, the operation terminal 120 is provided such that the display 124 and the touch panel 125 overlap with each other. The operation terminal 120 is provided with the detection surface 120a of the touch panel 125. The touch panel 125 can detect a finger or the like that is in contact with or in proximity to the detection surface 120a. The detection surface 120a also serves as a display surface of the display 124 to display images. An indicator 120b, which is an operation indication body operated by the operator, is displayed on the detection surface 120a by the operation of the display 124. The operator performs rotation operation on the operation terminal 120, thereby allowing the suspension operation system 200 to control the toe angle θt of the tire wheel assembly 104. The operator operates the indicator 120b displayed on the operation terminal 120, thereby allowing the suspension operation system 200 to control the camber angle θc of the tire wheel assembly 104.

Specifically, as illustrated in FIG. 11, the posture of the operation terminal 120 at the reference posture P0 of each of the tire wheel assemblies 104L and 104R is referred to as a reference state Q0. In the reference state Q0, a direction that is in parallel with the detection surface 120a and in parallel with a long side of the detection surface 120a is referred to as a first direction Dx. A direction that is in parallel with the detection surface 120a and orthogonal to the first direction Dx is referred to as a second direction Dy. A direction orthogonal to the first direction Dx and the second direction Dy is referred to as a third direction Dz.

A virtual axis that passes through the central part of the detection surface 120a and is orthogonal to the detection surface 120a is referred to as a rotation axis B2. A virtual line that is orthogonal to the rotation axis B2 and in parallel with the second direction Dy is referred to as a reference line B3. The operator can control the toe angle θt of the tire wheel assembly 104 by performing the rotation operation on the operation terminal 120 around the rotation axis B2 serving as the rotation center. In the reference state Q0, the reference line B3 is directed in parallel with the second direction Dy and the toe angle θt of the tire wheel assembly 104 is 0°.

In a first state Q1 illustrated in FIG. 11, the operation terminal 120 rotates in an arrow D1 direction, which is a clockwise direction, from the reference state Q0 around the rotation axis B2 serving as the rotation center. In the first state Q1, the sensor 126 (refer to FIG. 5) detects a rotation angle θr. The rotation angle θr is an angle made between the reference line B3 in the reference state Q0 and a reference line B4 in the reference state Q1. The second calculator 123 calculates the operation command So by associating the rotation angle θr with the toe angle θt of the tire wheel assembly 104. The control device 9 (refer to FIG. 5) receives the operation command So, and the first calculator 93 calculates the actuator length LA associated with the rotation angle θr. Each drive circuit 94 outputs the drive signal Sc to the corresponding actuator 5.

Accordingly, at a first posture P1 as illustrated in FIG. 12, the control device 9 controls the actuator length LA of each extension-retraction link 2 of the tire wheel assembly 104L on the basis of the operation command So from the operation terminal 120. For example, the control device 9 performs control such that each of the actuator lengths LA of the second extension-retraction link 2b and the third extension-retraction link 2c is longer than the actuator length LA of the first extension-retraction link 2a. The control device 9 performs control such that each of the actuator lengths LA of the fourth extension-retraction link 2d and the fifth extension-retraction link 2e is shorter than the actuator length LA of the first extension-retraction link 2a. As a result, the toe angle θt of the tire wheel assembly 104L becomes +20°, for example.

Likewise, at the first posture P1, the control device 9 controls the actuator length LA of each extension-retraction link 2 of the tire wheel assembly 104R on the basis of the operation command So from the operation terminal 120. For example, the control device 9 performs control such that each of the actuator lengths LA of the second extension-retraction link 2b and the third extension-retraction link 2c is shorter than the actuator length LA of the first extension-retraction link 2a. The control device 9 performs control such that each of the actuator lengths LA of the fourth extension-retraction link 2d and the fifth extension-retraction link 2e is longer than the actuator length LA of the first extension-retraction link 2a. As a result, the toe angle θt of the tire wheel assembly 104R becomes +20°, for example.

In a second state Q2 illustrated in FIG. 11, the operation terminal 120 rotates in an arrow D2 direction, which is a counter clockwise direction, from the reference state Q0 around the rotation axis B2 serving as the rotation center. In the second state Q2, the sensor 126 (refer to FIG. 5) detects the rotation angle θr. The second calculator 123 calculates the operation command So by associating the rotation angle θr with the toe angle θt of the tire wheel assembly 104. In the same manner as in the first state Q1, the control device 9 (refer to FIG. 5) outputs the drive signal Sc based on the operation command So to each actuator 5.

Accordingly, at a second posture P2 as illustrated in FIG. 13, the control device 9 controls the actuator length LA of each extension-retraction link 2 of the tire wheel assembly 104L on the basis of the operation command So from the operation terminal 120. For example, the control device 9 performs control such that each of the actuator lengths LA of the second extension-retraction link 2b and the third extension-retraction link 2c is shorter than the actuator length LA of the first extension-retraction link 2a. The control device 9 performs control such that each of the actuator lengths LA of the fourth extension-retraction link 2d and the fifth extension-retraction link 2e is longer than the actuator length LA of the first extension-retraction link 2a. As a result, the toe angle θt of the tire wheel assembly 104L becomes −20°, for example.

Likewise, at the second posture P2, the control device 9 controls the actuator length LA of each extension-retraction link 2 of the tire wheel assembly 104R on the basis of the operation command So from the operation terminal 120. For example, the control device 9 performs control such that each of the actuator lengths LA of the second extension-retraction link 2b and the third extension-retraction link 2c is longer than the actuator length LA of the first extension-retraction link 2a. The control device 9 performs control such that each of the actuator lengths LA of the fourth extension-retraction link 2d and the fifth extension-retraction link 2e is shorter than the actuator length LA of the first extension-retraction link 2a. As a result, the toe angle θt of the tire wheel assembly 104R becomes −20°, for example.

As described above, the suspension operation system 200 can control the toe angle θt by performing the rotation operation on the operation terminal 120. Accordingly, the operator can control the toe angle θt by operating the operation terminal 120 with a similar sense to that when operating the conventional steering wheel.

FIGS. 12 and 13 illustrate cases where the toe angle θt is +20° and the toe angle θt is −20°, respectively, which are mere examples. The control device 9 can control the toe angle θt continuously such that the toe angle θt is any angle between −20° and +20° inclusive. The control device 9 can control the toe angle θt continuously such that the toe angle θt is any angle equal to or larger than +20° or equal to or smaller than −20°.

Figure 14:
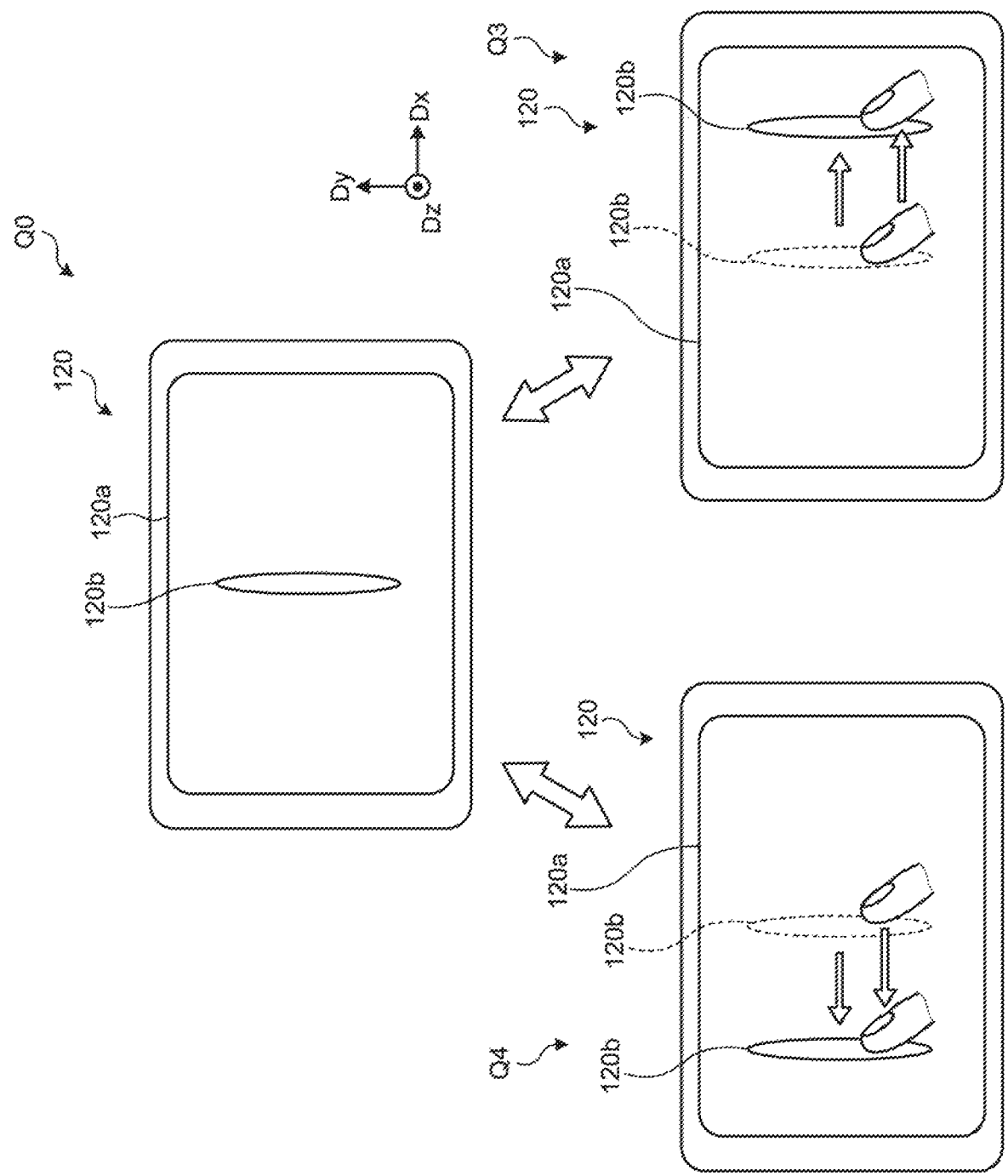
FIG. 14 is a diagram for explaining an exemplary operation for operating the camber angle of the wheel by the suspension operation terminal.
Figure 15:
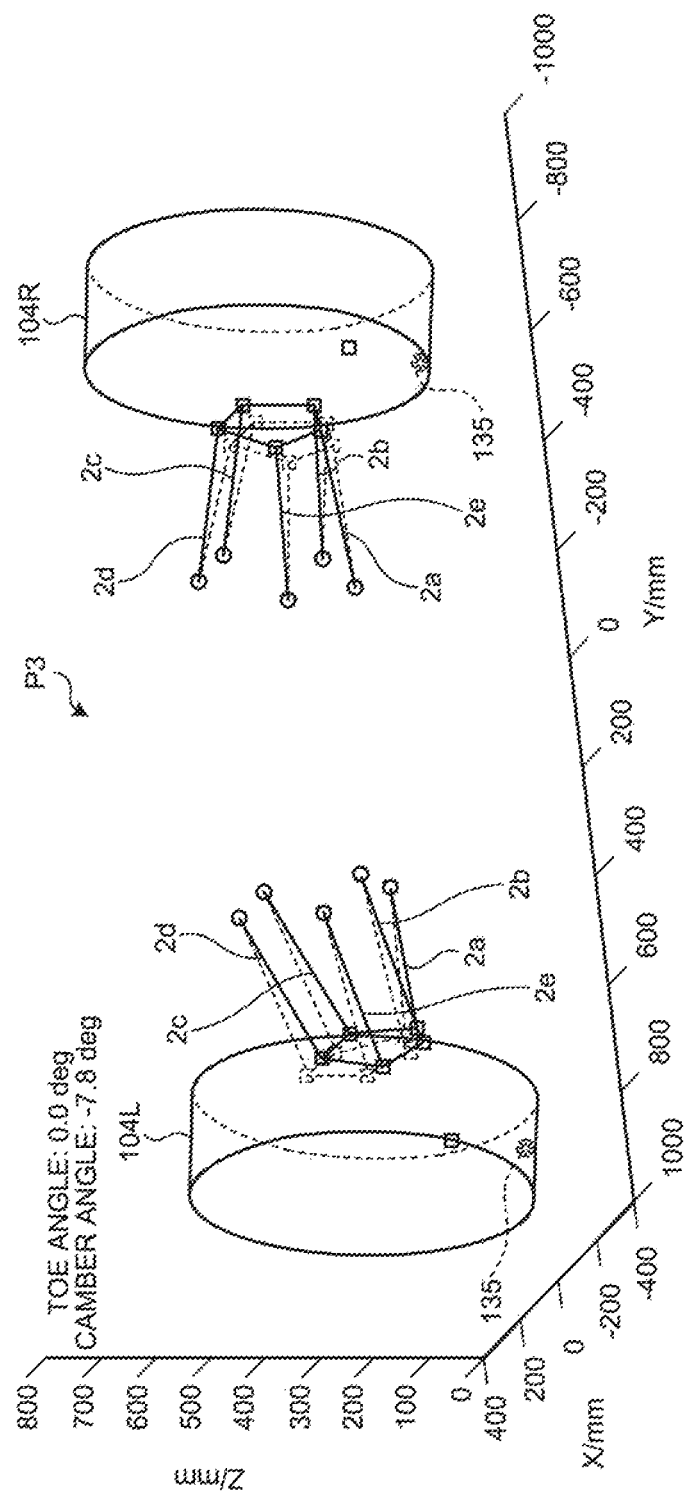
FIG. 15 is a diagram for explaining a relation between the wheel and the suspension when the camber angle is −7.8°.
Figure 16:
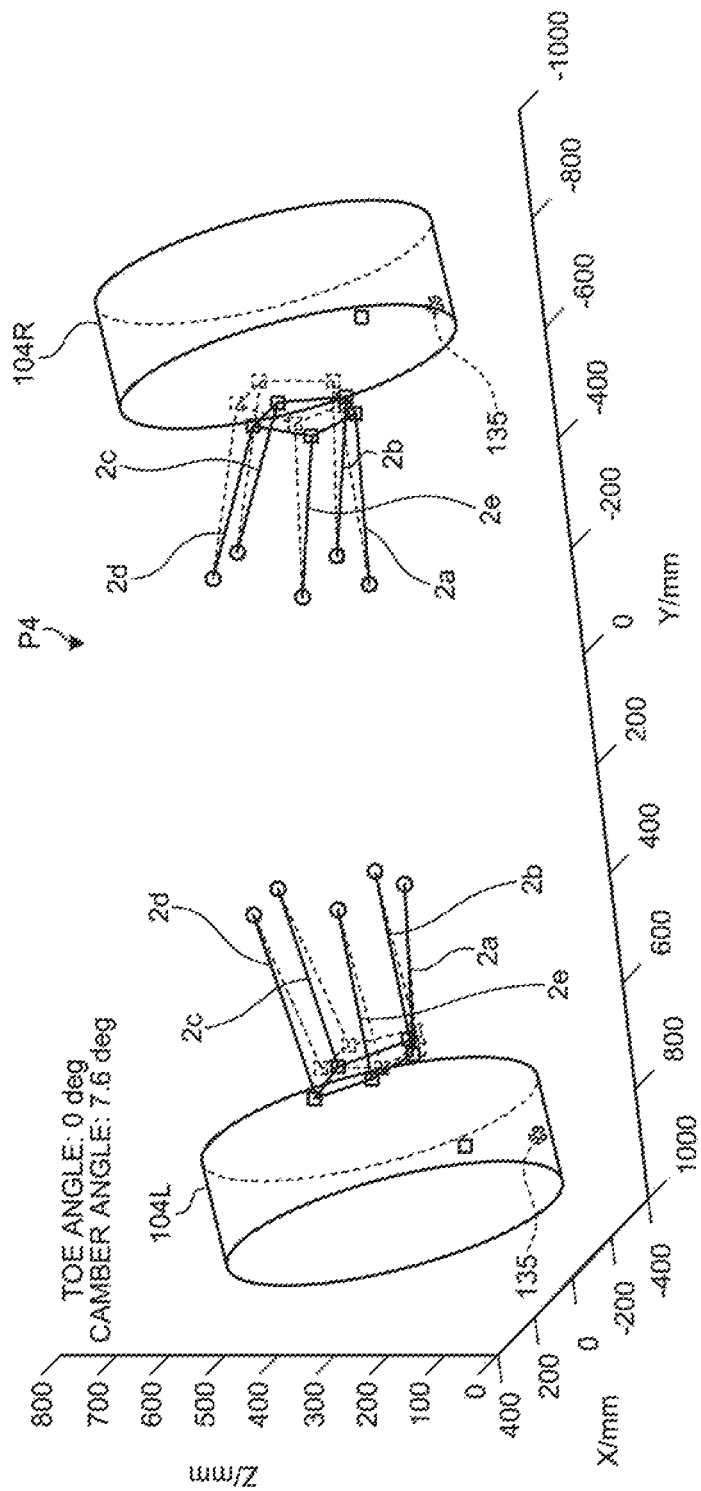
FIG. 16 is a diagram for explaining a relation between the wheel and the suspension when the camber angle is +7.6°.

The following describes a method for controlling the camber angle θc of the tire wheel assembly 104 by the operation of the operation terminal 120 with reference to FIG. 5 and FIGS. 14 to 16. FIG. 14 is a diagram for explaining an exemplary operation for operating the camber angle of the wheel by the suspension operation terminal. FIG. 15 is a diagram for explaining a relation between the wheel and the suspension when the camber angle is −7.8°. FIG. 16 is a diagram for explaining a relation between the wheel and the suspension when the camber angle is +7.6°. As illustrated in FIG. 14, in the reference state Q0, the indicator 120b is located at the central portion in the first direction Dx on the detection surface 120a. At this time, the camber angle θc of the tire wheel assembly 104 is 0°.

In a third state Q3 illustrated in FIG. 14, the indicator 120b is moved in the first direction Dx by the operator's operation. Specifically, the operator makes a finger in contact with the detection surface 120a at a position of the indicator 120b, and moves the indicator 120b in a slide manner in the first direction Dx with the contact state. That is, the operator performs so-called swipe operation. The touch panel 125 (refer to FIG. 5) detects the position and the movement of the finger that is in contact with or in proximity to the detection surface 120a. The display 124 moves the indicator 120b in the first direction Dx with the movement of the finger on the basis of the information from the touch panel 125. The second calculator 123 calculates the operation command So by associating the information about the position and the operation from the touch panel 125 with the camber angle θc of the tire wheel assembly 104. The control device 9 (refer to FIG. 5) receives the operation command So and the first calculator 93 calculates the actuator length LA associated with the information from the touch panel 125. Each drive circuit 94 outputs the drive signal Sc to the corresponding actuator 5.

Accordingly, at a third posture P3 as illustrated in FIG. 15, the control device 9 controls the actuator length LA of each extension-retraction link 2 of the tire wheel assembly 104L on the left side on the basis of the operation command So from the operation terminal 120. For example, the control device 9 performs control such that each of the actuator lengths LA of the second extension-retraction link 2b and the fifth extension-retraction link 2e is shorter than the actuator length LA of the first extension-retraction link 2a.

The control device 9 performs control such that each of the actuator lengths LA of the third extension-retraction link 2c and the fourth extension-retraction link 2d is shorter than each of the actuator lengths LA of the second extension-retraction link 2b and the fifth extension-retraction link 2e. As a result, the camber angle θc of the tire wheel assembly 104L becomes −7.8°, for example.

Likewise, at the third posture P3, the control device 9 controls the actuator length LA of each extension-retraction link 2 of the tire wheel assembly 104R on the right side on the basis of the operation command So from the operation terminal 120. For example, the control device 9 performs control such that each of the actuator lengths LA of the third extension-retraction link 2c and the fourth extension-retraction link 2d is shorter than each of the actuator lengths LA of the first extension-retraction link 2a, the second extension-retraction link 2b, and the fifth extension-retraction link 2e. As a result, the camber angle θc of the tire wheel assembly 104R becomes −7.8°, for example.

In a fourth state Q4 illustrated in FIG. 14, the indicator 120b is moved by the operator's operation in the opposite direction of the direction in the third state Q3 with respect to the position of the reference state Q0. Specifically, the operator makes the finger in contact with the indicator 120b and moves the indicator 120b in a slide manner in the opposite direction of the first direction Dx with the state of the finger being in contact with the detection surface 120a. Accordingly, the indicator 120b is moved in the opposite direction of the first direction Dx with the movement of the finger. The touch panel 125 (refer to FIG. 5) detects the position of the finger that is in contact with or in proximity to the detection surface 120a. The second calculator 123 calculates the operation command So by associating the information about the position and the operation from the touch panel 125 with the camber angle θc of the tire wheel assembly 104. The control device 9 (refer to FIG. 5) outputs the drive signal Sc on the basis of the operation command So to each actuator 5.

Accordingly, at a fourth posture P4 as illustrated in FIG. 16, the control device 9 controls the actuator length LA of each extension-retraction link 2 of the tire wheel assembly 104L on the basis of the operation command So from the operation terminal 120. For example, the control device 9 performs control such that each of the actuator lengths LA of the third extension-retraction link 2c and the fourth extension-retraction link 2d is longer than each of the actuator lengths LA of the first extension-retraction link 2a, the second extension-retraction link 2b, and the fifth extension-retraction link 2e. As a result, the camber angle θc of the tire wheel assembly 104L becomes +7.6°, for example.

Likewise, at the fourth posture P4, the control device 9 controls the actuator length LA of each extension-retraction link 2 of the tire wheel assembly 104R on the basis of the operation command So from the operation terminal 120. For example, the control device 9 performs control such that each of the actuator lengths LA of the third extension-retraction link 2c and the fourth extension-retraction link 2d is shorter than each of the actuator lengths LA of the first extension-retraction link 2a, the second extension-retraction link 2b, and the fifth extension-retraction link 2e. As a result, the camber angle θc of the tire wheel assembly 104R becomes +7.6°, for example.

As described above, the operator can control the camber angle θc of the tire wheel assemblies 104L and 104R by operating the indicator 120b, which is the operation indication body displayed on the operation terminal 120. Accordingly, the operator can check the state of the camber angle θc by visually recognizing the position of the indicator 120b. The suspension operation system 200 allows a larger degree of freedom in operating the operation terminal 120 than that of the conventional steering wheels, thereby allowing easy control of the toe angle θt and the camber angle θc of the tire wheel assemblies 104L and 104R. The suspension operation system 200 can increase a degree of freedom in operating the postures of the tire wheel assemblies 104L and 104R.

FIGS. 15 and 16 illustrate cases where the camber angle θc is +7.6° and −7.8°, respectively, which are mere examples. The control device 9 can control the camber angle θc continuously such that the camber angle θt is any angle between −7.8° and +7.6° inclusive. The control device 9 can control the camber angle θc continuously such that the camber angle θc is any angle equal to or larger than +7.6° or equal to or smaller than −7.8°. In the examples described above, the tire wheel assemblies 104R and 104L are tilted in the same direction. The control may be performed such that the tire wheel assemblies 104R and 104L are tilted in mutually opposite directions.

Figure 17:
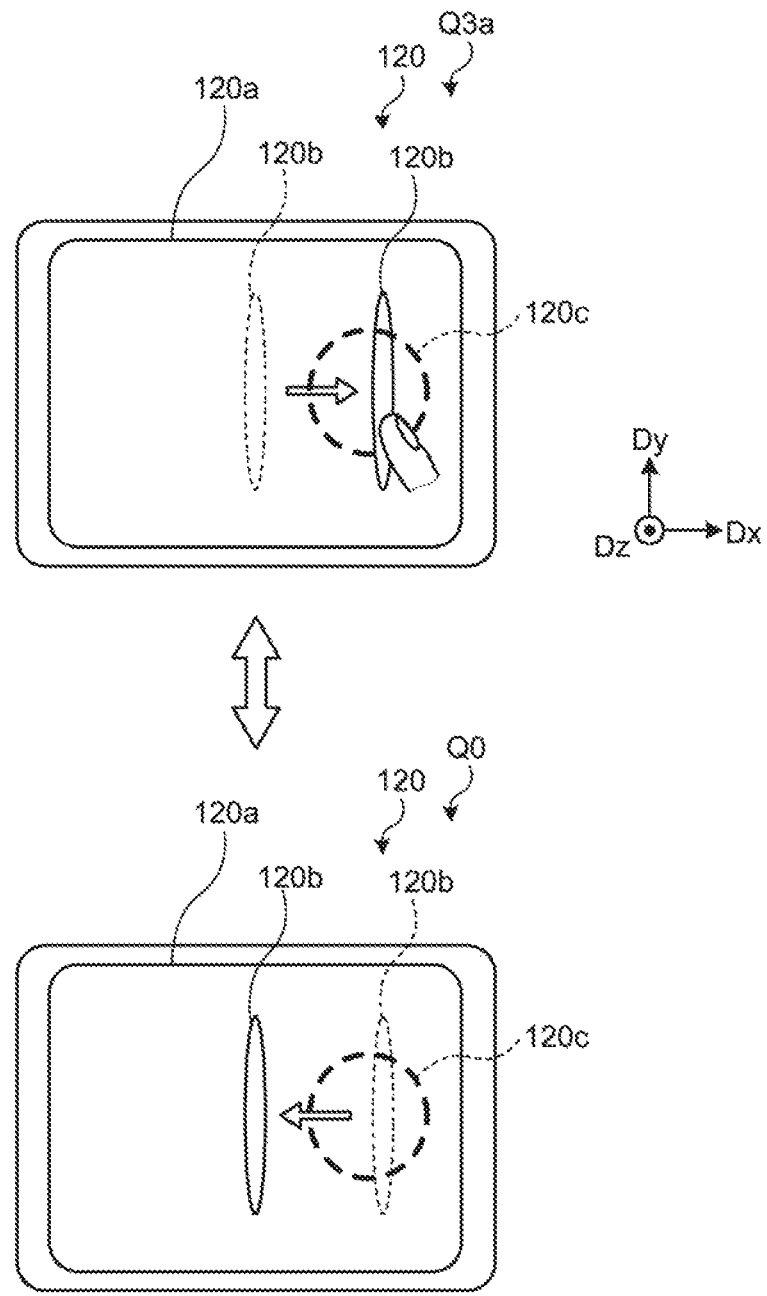
FIG. 17 is a diagram for explaining another exemplary operation for operating the camber angle of the wheel by the suspension operation terminal.
Figure 18:
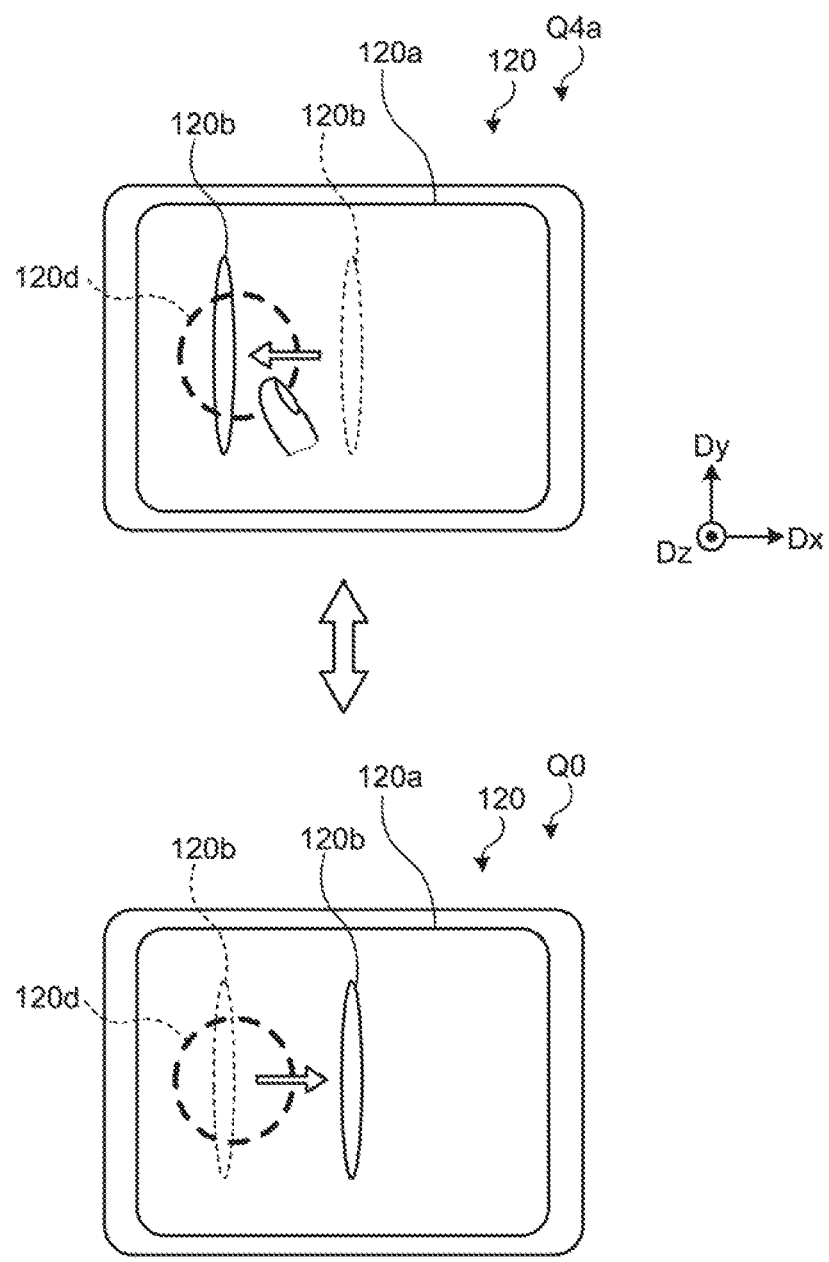
FIG. 18 is a diagram for explaining still another exemplary operation for operating the camber angle of the wheel by the suspension operation terminal.

The operation methods of the operation terminal 120 illustrated in FIGS. 11 and 14 are mere examples, and may be changed as appropriate. FIG. 17 is a diagram for explaining another exemplary operation for operating the camber angle of the wheel by the suspension operation terminal. FIG. 18 is a diagram for explaining still another exemplary operation for operating the camber angle of the wheel by the suspension operation terminal.

In a third state Q3a illustrated in FIG. 17, the indicator 120b is moved in the first direction Dx by the operator's operation. Specifically, the operator makes a finger in contact with a region 120c on the right side of the indicator 120b on the detection surface 120a with the state of the indicator 120b being located at the center (in the reference state Q0). The touch panel 125 detects the contact of the finger with the region 120c. The display 124 moves the indicator 120b in the first direction Dx with the movement of the finger on the basis of the information from the touch panel 125. The second calculator 123 calculates the operation command So by associating the positional information from the touch panel 125 with the camber angle θc of the tire wheel assembly 104. The control device 9 (refer to FIG. 5) outputs the drive signal Sc on the basis of the operation command So to each actuator 5. As a result, the camber angle θc of the tire wheel assemblies 104L and that of 104R are controlled in the same manner as FIG. 15.

As illustrated in FIG. 17, when the operator releases the finger from the region 120c, the state returns to the reference state Q0. Specifically, the touch panel 125 detects that the finger is not in contact with the region 120c. The display 124 moves the indicator 120b to the center of the detection surface 120a on the basis of the information from the touch panel 125. The second calculator 123 calculates the operation command So by associating the positional information from the touch panel 125 with the camber angle θc of the tire wheel assembly 104. The control device 9 (refer to FIG. 5) outputs the drive signal Sc on the basis of the operation command So to each actuator 5. As a result, the camber angle θc of each of the tire wheel assemblies 104L and 104R is controlled to 0° in the same manner as FIG. 6.

In a fourth state Q4a illustrated in FIG. 18, the indicator 120b is moved in the opposite direction of the first direction Dx by the operator's operation. Specifically, the operator makes a finger in contact with a region 120d on the left side of the indicator 120b on the detection surface 120a with the state of the indicator 120b being located at the center (in the reference state Q0). The touch panel 125 detects the contact of the finger with the region 120*d*. The display 124 moves the indicator 120*b* in the opposite direction of the first direction Dx with the movement of the finger on the basis of the information from the touch panel 125. The second calculator 123 calculates the operation command So by associating the positional information from the touch panel 125 with the camber angle θc of the tire wheel assembly 104. The control device 9 (refer to FIG. 5) outputs the drive signal Sc on the basis of the operation command So to each actuator 5. As a result, the camber angle θc of each of the tire wheel assemblies 104L and 104R is controlled in the same manner as FIG. 16.

As illustrated in FIG. 18, when the operator releases the finger from the region 120*d*, the state returns to the reference state Q0. Specifically, the touch panel 125 detects that the finger is not in contact with the region 120*d*. The display 124 moves the indicator 120*b* to the center of the detection surface 120*a* on the basis of the information from the touch panel 125. The second calculator 123 calculates the operation command So by associating the positional information from the touch panel 125 with the camber angle θc of the tire wheel assembly 104. The control device 9 (refer to FIG. 5) outputs the drive signal Sc on the basis of the operation command So to each actuator 5. As a result, the camber angle θc of each of the tire wheel assemblies 104L and 104R is controlled to 0° in the same manner as FIG. 6.

FIG. 19 is a diagram for explaining another exemplary operation for operating the posture of the wheel by the suspension operation terminal. As illustrated in FIG. 19, in a reference state Q0*a*, the display 124 displays a first operation button 120*e* and a second operation button 120*f*. The first operation button 120*e* and the second operation button 120*f* are used for switching the control of the toe angle θt and the camber angle θc, respectively.

When the operator makes the finger in contact with the first operation button 120*e*, the state proceeds to a fifth state Q5, in which the display 124 displays toe angle control buttons 120*g* and 120*h*. When the operator operates the toe angle control button 120*g* on the right side, the toe angle θt of each of the tire wheel assemblies 104L and 104R is changed to that in the plus Y direction. When the operator operates the toe angle control button 120*h* on the left side, the toe angle θt of each of the tire wheel assemblies 104L and 104R is changed to that in the minus Y direction. When the operator operates an end button 120*i*, the state returns to the reference state Q0*a*.

When the operator makes the finger in contact with the second operation button 120*f*, the state proceeds to a sixth state Q6, in which the display 124 displays camber angle control buttons 120*j* and 120*k*. When the operator operates the camber angle control button 120*j* on the right side, the camber angle θc of each of the tire wheel assemblies 104L and 104R is changed to that in the plus Y direction. When the operator operates the camber angle control button 120*k* on the left side, the camber angle θc of each of the tire wheel assemblies 104L and 104R is changed to that in the minus Y direction.

In this modification example, the toe angle θt and the camber angle θc of the tire wheel assemblies 104L and 104R can be controlled by operating the various buttons. This can allow simple control of the operation terminal 120.

The structures of the control device 9 and the operation terminal 120 illustrated in FIG. 5 and the like can be changed as appropriate. For example, the operation terminal 120 may transmit, to the control device 9, the positional information and the operation information from the touch panel 125 or information about the rotation angle from the sensor 126.

The detection surface 120*a* of the operation terminal 120 illustrated in FIG. 10 and the like can also be changed as appropriate. The shape and the size of the indicator 120*b* are not limited to those exemplarily illustrated in FIG. 10 and the like. The operation terminal 120 can wirelessly communicate with the control device 9. Alternatively, the operation terminal 120 may have a wired connection to the control device 9.

The suspension operation system 200 can change a caster angle, a tread width, and a wheelbase, for example, besides the toe angle θt and the camber angle θc. The caster angle is, when the vehicle 10 is viewed from the horizontal direction, an angle made by a straight line parallel with the longitudinal direction of the shock absorber 11 with respect to the vertical line. The tread width is a distance between the centers of the left and right wheels 102. The wheelbase is a distance between the centers of the front and rear wheels 102.

The suspension 1 is not necessarily applied to vehicles with the hub units 101 having motors and the like built-in. The suspension 1 may be connected to the hub bearing supporting the wheel 102.

The suspension 1 does not necessarily include five extension-retraction links 2. The suspension 1 is only required to include a plurality of links, at least one of which should be the extension-retraction link 2.

As described above, the suspension operation system 200 includes: the suspension 1 that includes a plurality of links (extension-retraction links 2) supporting the wheel (the tire wheel assembly 104), at least one or more of the links including the actuator 5 increasing and decreasing its length in the axial direction; the control device 9 that supplies the drive signal Sc to the actuator 5 to control the operation of the suspension 1; and the suspension operation terminal (operation terminal 120) that operates the suspension 1. The operation terminal 120 includes: the detector that detects the operation input information to the operation terminal 120; and the communicator (the second communicator 122) that transmits the information about the target posture of the wheel, the information being based on the operation input information, to the control device 9 as the operation command So. The control device 9 includes: the first calculator 93 that calculates the length of the actuator 5 on the basis of the operation command So; and the drive circuit 94 that produces the drive signal Sc on the basis of the information from the first calculator 93.

Accordingly, the operator can control the suspension 1 including the plurality of extension-retraction links 2 by operating the operation terminal 120, thereby allowing a larger degree of freedom in operating the suspension 1 than the conventional steering wheels. The suspension operation system 200 can easily control the posture of the wheel by operating the suspension 1 including the plurality of extension-retraction links 2.

The operation terminal 120 includes the second calculator 123 that calculates the operation command So on the basis of the operation input information. The operation command So includes the information about at least one of the toe angle θt and the camber angle θc of the wheel. This makes it possible to control the toe angle θt and the camber angle θc of the wheel by the operation of the operation terminal 120, thereby allowing an increased degree of freedom in operating the posture of the wheel.

The operation terminal 120 further includes the display 124 that displays images. The detector includes the touch panel 125 that detects touch input to the detection surface 120*a*. The second calculator 123 calculates the operation command So by associating the operation input information from the touch panel 125 provided by the slide operation performed on the operation indication body (indicator 120b) displayed on the detection surface 120a with the camber angle θc of the wheel. Accordingly, the operator can control the camber angle θc of the wheel by operating the touch panel 125. The operator can determine whether the camber angle θc of the wheel is operated by performing the slide operation on the displayed indicator 120b. Consequently, the suspension operation system 200 can easily operate the camber angle θc of the wheel. The vehicle using the suspension operation system 200 can adjust the motion performance of the vehicle by controlling the camber angles of the wheels in accordance with running conditions and running environments.

The detector includes the sensor 126 that detects the rotation around the direction orthogonal to the detection surface 120a of the operation terminal 120, the direction serving as the rotation center axis. The second calculator 123 calculates the toe angle θt of the wheel on the basis of the rotation angle of the operation terminal 120 from the sensor 126. Accordingly, the operator can control the toe angle θt of the wheel by performing the rotation operation on the operation terminal 120. The suspension operation system 200 associates the rotation operation of the operation terminal 120 with the toe angle θt of the wheel, in the same manner as the operation of the conventional steering wheel, thereby allowing easy control of the toe angle θt of the wheel.

The communicator (the second communicator 122) wirelessly transmits the operation command So to the control device 9. Accordingly, the operation terminal 120 can wirelessly communicate with the control device 9. Consequently, the operation terminal 120 can be stored at a location where the operation terminal 120 does not interfere with occupants when the operation terminal 120 is not operated such as a case where the vehicle is in an automatic drive mode. This can lead to improved comfortableness.

The operation terminal 120 includes: the detector that detects the operation input information for operating the suspension 1 including the plurality of extension-retraction links 2 supporting the wheel; and the communicator (the second communicator 122) that transmits the information about the target posture of the wheel, the information being calculated based on the operation input information, to the control device 9 as the operation command So. The operation terminal 120 operates the posture of the wheel by driving the actuator 5 included in at least one or more of the extension-retraction links 2 so as to increase or decrease the length in the axial direction of the actuator 5 on the basis of the operation command So.

Accordingly, the operator can control the suspension 1 including the plurality of extension-retraction links 2 by operating the operation terminal 120, thereby allowing a larger degree of freedom in operating the suspension 1 than the conventional steering wheels. Operating the suspension including the plurality of links with the operation terminal 120 allows easy control of the posture of the wheel.

The operation terminal 120 further includes: the calculator (the second calculator 123) that calculates the operation command So on the basis of the operation input information; and the display 124 that displays images. The detector includes the touch panel 125 that detects touch input to the detection surface 120a. The display 124 displays the indicator 120b associated with the camber angle θc of the wheel on the detection surface 120a. The second calculator 123 calculates the operation command So by associating the operation input information from the touch panel 125 provided by the slide operation performed on the indicator 120b with the camber angle θc of the wheel. Accordingly, the operator can control the camber angle θc of the wheel by operating the touch panel 125. The operator can determine whether the camber angle θc of the wheel is operated by performing the slide operation on the displayed indicator 120b. Consequently, the operation terminal 120 can easily operate the camber angle of the wheel.

REFERENCE SIGNS LIST 1 suspension
2 extension-retraction link
3 stationary shaft
4 movable shaft
5 actuator
9 control device
92 first communicator
93 first calculator
94a first drive circuit
94b second drive circuit
94e fifth drive circuit
95 first storage
104, 104L, 104R tire wheel assembly
120 operation terminal
121 controller
122 second communicator
123 second calculator
124 display
125 touch panel
126 sensor
200 suspension operation system
LA actuator length
Sa target posture signal
SLa, SLb length command signal
Sc drive signal
So operation command
θc camber angle
θt toe angle

The invention claimed is:
1. A suspension operation system, comprising:
a suspension that includes a plurality of links supporting a wheel, at least one or more of the links having an actuator increasing or decreasing a length of the actuator in an axial direction;
a control device that supplies a drive signal to the actuator to control operation of the suspension; and
a suspension operation terminal that operates the suspension, wherein
the suspension operation terminal includes: a detector that detects operation input information to the suspension operation terminal; a communicator that transmits information about a target posture of the wheel, the information being based on the operation input information, to the control device as an operation command; and a second calculator that calculates the operation command on the basis of the operation input information,
the control device includes: a first calculator that calculates the length of the actuator on the basis of the operation command; and a drive circuit that produces the drive signal on the basis of information from the first calculator,
the operation command includes information about at least one of a toe angle or a camber angle of the wheel, the detector includes a sensor that detects rotation around a direction orthogonal to a detection surface of the suspension operation terminal, the direction serving as a center axis, and the second calculator calculates the operation command by associating a rotation angle of the suspension operation terminal from the sensor with the toe angle of the wheel.

2. The suspension operation system according to claim 1, wherein the suspension operation terminal further includes a display that displays an image, the detector includes a touch panel that detects touch input to a detection surface, and the second calculator calculates the operation command by associating operation input information from the touch panel provided by slide operation performed on an operation indication body displayed on the detection surface with the camber angle of the wheel.

3. The suspension operation system according to claim 1, wherein the communicator wirelessly transmits the operation command to the control device.

4. A suspension operation terminal for operating a suspension, comprising:

a detector that detects operation input information for operating the suspension including a plurality of links supporting a wheel;

a communicator that wirelessly transmits information about a target posture of the wheel, the information being calculated on the basis of the operation input information, to a control device as an operation command; and a calculator that calculates the operation command on the basis of the operation input information, wherein the detector includes a sensor that detects rotation around a direction orthogonal to a detection surface of the suspension operation terminal, the direction serving as a center axis, the calculator calculates the operation command by associating a rotation angle of the suspension operation terminal from the sensor with the toe angle of the wheel, and the suspension operation terminal operates a posture of the wheel by operating an actuator to increase or decrease a length of the actuator in an axial direction on the basis of the operation command, the actuator being included in at least one or more of the links.

5. The suspension operation terminal according to claim 4, further comprising:

a display that displays an image, wherein the detector includes a touch panel that detects touch input to a detection surface, the display displays an operation indication body on the detection surface, the operation indication body being associated with a camber angle of the wheel, and the calculator calculates the operation command by associating operation input information from the touch panel provided by slide operation performed on the operation indication body with the camber angle of the wheel.

* * * * *